United States Patent [19]
Bobrow et al.

[11] Patent Number: 5,831,853
[45] Date of Patent: Nov. 3, 1998

[54] AUTOMATIC CONSTRUCTION OF DIGITAL CONTROLLERS/DEVICE DRIVERS FOR ELECTRO-MECHANICAL SYSTEMS USING COMPONENT MODELS

[75] Inventors: Daniel G. Bobrow, Palo Alto; Vijay A. Saraswat, Fermont; Vineet Gupta, Palo Alto, all of Calif.

[73] Assignee: XEROX Corporation, Stamford, Conn.

[21] Appl. No.: 478,137

[22] Filed: Jun. 7, 1995

[51] Int. Cl.⁶ .................................................. G06F 19/00
[52] U.S. Cl. ........................... 364/191; 364/578; 395/919
[58] Field of Search .................................. 364/140–143, 364/147, 191, 192, 578, 580; 395/500, 700, 650, 919–923; 355/206; 399/75–77, 81

[56] References Cited

U.S. PATENT DOCUMENTS

| | | | |
|---|---|---|---|
| 4,991,176 | 2/1991 | Dahbura et al. | 371/27 |
| 5,038,307 | 8/1991 | Krishnakumar et al. | 364/578 |
| 5,056,014 | 10/1991 | Burrows | 364/200 |
| 5,125,098 | 6/1992 | Burrows | 395/800 |
| 5,161,115 | 11/1992 | Teshima et al. | 364/580 |
| 5,163,016 | 11/1992 | Har'El et al. | 364/578 |
| 5,287,194 | 2/1994 | Lobiondo | 395/114 |
| 5,301,100 | 4/1994 | Wagner | 364/141 |
| 5,325,528 | 6/1994 | Klein | 395/650 |
| 5,363,175 | 11/1994 | Matysek | 355/206 |
| 5,485,600 | 1/1996 | Joseph et al. | 395/500 |
| 5,542,070 | 7/1996 | LeBlanc et al. | 395/500 |

*Primary Examiner*—Thomas C. Lee
*Assistant Examiner*—Steven R. Garland
*Attorney, Agent, or Firm*—Fay, Sharpe, Beall, Fagan, Minnich & McKee

[57] ABSTRACT

Qualitative reasoning for physical systems, and techniques for automatic code generation are used to automatically construct digital controllers/device drivers for electro-mechanical systems. Such construction uses models of the system's components described as finite state machines, to form a configuration space. Transitions of the configuration space are labelled as external or internal and a state of the system is identified as a desired state while other states are identified as undesirable. From this configuration space a controller is generated to drive the system to the desired state while avoiding the undesirable states.

10 Claims, 8 Drawing Sheets

```
MOTOR(INIT_ELEV, VEL)::                                              70
    ELEV = INIT_ELEV,
    HENCE (IF (MOTOR = ON) THEN d (ELEV)/dt = VEL,
          IF (MOTOR = OFF) THEN d(ELEV)/dt = 0),
    ALWAYS (IF MOTOR (ON) THEN DO ALWAYS MOTOR = ON WATCHING MOTOR (OFF),
            IF MOTOR (OFF) THEN DO ALWAYS MOTOR = OFF WATCHING MOTOR(ON ).

PAPER_FEEDER (INIT_PAPER, PAPER_RATE)::
    PAPER = INIT_PAPER,
    HENCE IF FEEDER = ON THEN d(PAPER)/dt = -PAPER_RATE ELSE d(PAPER)/dt = 0,
    ALWAYS IF (P = 1 ∧ E = 1) THEN FEEDER = ON.

SWITCH (NAME, HEIGHT, TRIP, TOLERANCE)::
    ALWAYS (IF (BROKEN (NAME) v HEIGHT (NAME) < HEIGHT + TRIP) THEN NAME = 0,
            IF HEIGHT (NAME) ≥ HEIGHT +TOLERANCE THEN HENCE BROKEN (NAME),
            IF NAME = 0 ELSE NAME = 1).

SWITCH P (NOM. HEIGHT P, TRIP P, TOLERANCE P )::
    SWITCH (P, NOM_HEIGHT P, TRIP P, TOLERANCE P ),
    ALWAYS (IF ELEV + PAPER ≥ NOM_HEIGHT P  THEN HEIGHT (P) = ELEV + PAPER
                                            ELSE HEIGHT (P) = NOM_HEIGHT P ).

SWITCH E (NOM_HEIGHT E, TRIP E, TOLERANCE E )::
    SWITCH (E, NOM_HEIGHT E, TRIP E, TOLERANCE E ),
    ALWAYS (IF (PAPER > 0 ∧ ELEV + PAPER ≥ NOM_HEIGHT E )
                      THEN HEIGHT (E) = ELEV + PAPER
                      ELSE HEIGHT (E) = NOM_HEIGHT E ).

PAPER _TRAY (INIT_ELEV, VEL, INIT_PAPER, PAPER_RATE, NOM_HEIGHT P, TRIP P
  TOLERANCE P , NOM_HEIGHT E , TRIP E , TOLERANCE E )::
  DO (MOTOR ( INIT_ELEV, VEL), MOTOR (OFF),
      PAPER_FEEDER (INIT_PAPER, PAPER_RATE),
      SWITCH P (NOM_HEIGHT P , TRIP P , TOLERANCE P ),
      SWITCH E (NOM_HEIGHT E , TRIP E , TOLERANCE E )) WATCHING PAPER = 0

70a
GOAL_CONDITION ::
    CONTROL MOTOR (ON), MOTOR (OFF),        ── 70b

REACH FEEDER = ON  ◄──── 70c

AVOID BROKEN (E) v BROKEN (P)  ◄── 70d
```

FIG. 4

START :: WHENEVER RESET_TRAY DO (MOTOR = ON, WAIT_FOR_P_OR_E( $\Delta_0$ )).

WAIT_FOR_P_OR_E( $\Delta$ ) ::

(E=1 v P=1) BEFORE $\Delta$
        THEN (NOW E=1 THEN NOW P=1 THEN FEEDER_ON ELSE WAIT_FOR_P,
            NOW P=1 THEN NOW E=1 ELSE WAIT_FOR_E).
        ELSE MOTOR = OFF, ERROR = H_W_ERROR.

WAIT_FOR_P ::

P=1 BEFORE $\Delta_1$
        THEN (MOTOR = OFF, FEEDER = ON, FEEDER_ON)
        ELSE (MOTOR = OFF, ERROR = SWITCH_P_BROKEN).

WAIT_FOR_E ::

E=1 BEFORE $\Delta_2$
        THEN (MOTOR = OFF, FEEDER = ON, FEEDER_ON)
        ELSE (MOTOR = OFF, PAPER = EMPTY, START).

FEEDER_ON
    WHENEVER (E=0 v P=0)
        DO (MOTOR = ON)
        NOW P=0 THEN (NOW E = 0 THEN WAIT_FOR_P_OR_E( $\Delta_3$ ),
                          ELSE WAIT_FOR_P).
        NOW E=0 THEN (NOW P = 0 ELSE WAIT_FOR_E).

FIG. 6

AUTOMATIC CONSTRUCTION OF DIGITAL CONTROLLERS/DEVICE DRIVERS FOR ELECTRO-MECHANICAL SYSTEMS USING COMPONENT MODELS

BACKGROUND OF THE INVENTION

This application pertains to the construction of digital controllers/device drivers and more particularly to a method for automatic construction of digital controllers/device drivers to control electro-mechanical systems, based on finite state machine (FSM) models of the system components.

The invention is particularly applicable to generating a model of a system which can then be used for a number of different purposes. The system model consists of a physical model of the components, their interconnections, and a specification of the task to be performed. The component models can be obtained from a library of models. Using this model, it is possible to generate control code which ensures that during operation the system will meet the desired task or will appropriately report information regarding a failure. The subject invention combines concepts from qualitative reasoning for physical systems with techniques for automatic generation of code from finite state machine (FSM) descriptions. The following discussion sets forth an example for the automatic construction of controllers for controlling a paper supply system of a copy machine, and will be described with particular reference thereto. However, it will be appreciated that the invention has broader applications, including printing machines, IOTs, communication systems, automated manufacturing, facility management environments and any other system or machine which includes electro-mechanical components.

Presently, digital controllers/device drivers used for controlling electro-mechanical systems such as paper trays and papers paths in a copy machine are generated manually by software engineers who have an informal understanding of how the devices which they are generating code for, operate. The engineers will simulate operation of the devices to the best of their ability and understanding to obtain a theoretical understanding of the behavior of a system and the components comprising the system. Thereafter, software code is hand-produced, usually in a language such as C or C++. A system controller generated by these techniques will accept power-up signals from the environment, drive motors, set time-outs, and prescribe the behaviors to be followed in case of erroneous executions. The construction of such coded systems is complex and error prone, and is susceptible to the introduction of subtle timing bugs.

It is noted that although certain terminology of the subject invention may appear somewhat similar to what is generally known as "automatic code generation", the subject invention is significantly different from concepts set forth in this area. Automatic code generation may be generally thought of as the automatic generation of compilers from a description of a target architecture and a description of language symantics. A distinction between this concept and the subject invention is that automatic code generation is directed to general purpose programs which take as input any programming language and from this input generate machine code.

On the other hand, the subject invention is directed to using as its input a description of a physical machine, i.e. electronic and mechanical, in order to produce an output such as a finite state machine, that can then be implemented as a controller to control the physical machine. The present invention is specifically directed to taking advantage of the presentation of continuous physical systems, whereas compiler work is directed to taking any arbitrary programming language such as Fortran, C, C++, etc. and generating a machine code to be used by the computer system. Therefore, the subject invention is controlling physical objects existing in the real world starting with physical objects existing in the real world. The subject invention is not, as is material directed to the compiler art, preceding from a description of languages and descriptions of computers which are attempting to run those languages.

The present invention contemplates a new and improved system for automatically constructing controllers for an electro-mechanical system which overcomes the above-referenced problems, and others, and provides a system with enhanced useability and interchangability.

SUMMARY OF THE INVENTION

In accordance with the present invention, controllers are automatically constructed by identifying the components which make up the electro-mechanical system. A dynamic behavior model of the system is generated using a set of constraints for each of the components. Thereafter a configuration space of the system is constructed using the dynamic behavior model of the system to generate a set of states, each of which represents a possible configuration of the system, and for generating a set of transitions which exist between the states. The transitions are labeled as an external transition or an internal transition, wherein the external transitions occur due to events beyond the control of the controller and wherein the internal transitions can be controlled by the controller. A desired state or goal condition of the system is identified as are undesirable states of the system. Thereafter, using the configuration space a program is automatically generated which drives the system from any one of the states of the system towards the desired state (goal condition). The program changes states based on external events, internal events and predetermined time periods.

In accordance with a more limited aspect of the present invention, the constraints are qualitative and quantitative constraints.

In yet another aspect of the subject invention, the automatically generated program operates to avoid entering undesirable states.

In accordance with still yet another aspect of the present invention, the internal transitions are controllable by the constructed controller.

In yet another aspect of the subject invention, diagnostic information regarding possible failures of the system are obtainable.

An advantage of the present invention is providing automatically constructed digital controllers/device drivers for electro-mechanical systems based on component models. Where the method combines concepts of qualitative reasoning for physical systems with techniques for automatic generation of code from finite state machine (FSM) descriptions.

Yet another advantage of the present invention is the generation of controllers to control components for a number of different purposes.

Yet another advantage of the present invention is the provision of a program to move a system from an initial state to a desired state (goal condition) without entering undesirable states.

Further advantages will become apparent to one of ordinary skill in the art upon a reading and understanding of the subject specification.

BRIEF DESCRIPTION OF THE DRAWINGS

The invention may take physical form in certain parts, and arrangements of parts, a preferred embodiment of which will be described in detail in the specification and illustrated in the accompanying drawings which form a part hereof, and wherein:

FIG. 4 provides a listing of the physical model of the paper supply of FIG. 2;

FIG. 6 is a generated code for controlling the paper supply system;

DETAILED DESCRIPTION OF THE PREFERRED EMBODIMENT

Figure 1:
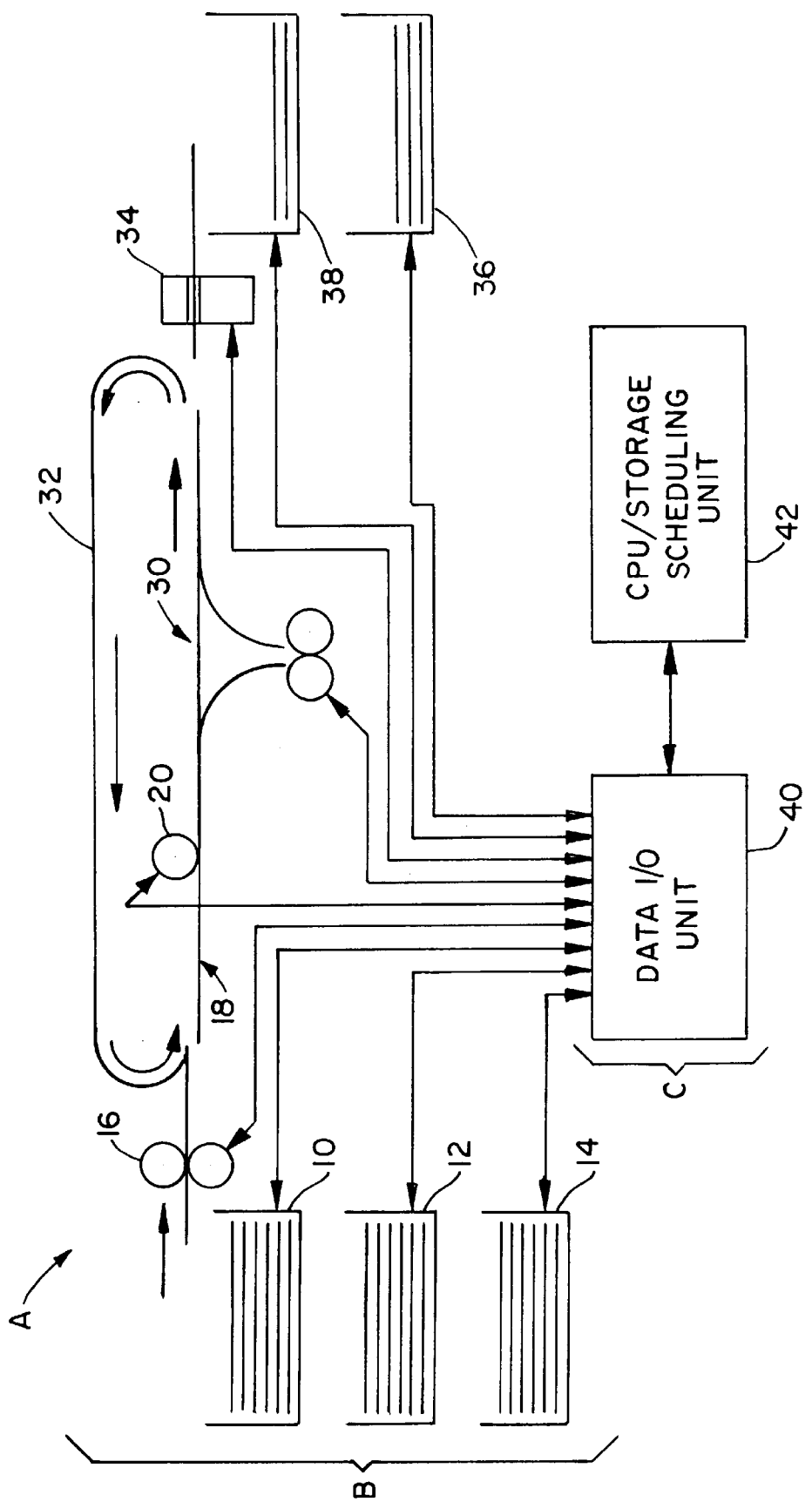
FIG. 1 is a schematic representation of a printing engine implementing the subject invention.

Turning now to the drawings provided for purposes of illustrating the preferred embodiment of the invention only, and not for purposes for limiting the same. FIG. 1 illustrates a print engine A which includes a plurality of systems B and a data processor unit C for inputting signals to the systems of print engine A. As used herein "print engine" includes any reprographic machine, such as printers, copiers, facsimile machines, and the like. In the discussion following, reference will be made to copy machines, copiers, copy operations, etc.

As will be detailed below, various capabilities provided with each of the systems B are ascertained and correlated in the data processor unit C. Such correlated and analyzed data is further analyzed in view of user input defining a desired copier operation, or series of operations. These inputs, which may also be called external events, along with internal events and predetermined time-outs are used to control operation of the copy machine to most efficiently accomplish a series of copy tasks. It should be appreciated that even though the present discussion is directed to a print engine, the described controller construction is intended to be used in conjunction with other continuous physical systems which include eelectro-mechanical components.

With continuing attention to FIG. 1, print engine A includes a plurality of paper storage bins. In the illustration, these include bins 10, 12, and 14. The plurality of bins may be representative of different paper sizes or secondary or reserved storage capabilities. A paper feeder mechanism is illustrated schematically at 16. As will be appreciated by one of ordinary skill in the art, a paper feeder such as illustrated at 16 will function to obtain paper from one or more of the bins.

The feeder 16 will feed paper to a conveyor 18. The conveyor will in turn, feed the paper to a print mechanism 20, the particular construction of which will be well known and within the understanding of one of ordinary skill in the art. Also illustrated in the figure is an inverter mechanism 30 that may selectively invert or flip paper that progresses along conveyor 18. A feedback-unit 32 is provided for returning the paper to the printer mechanism 20 for duplex printing thereof.

In the illustration, the conveyor 18 provides a path to a stapling mechanism 34 for selectively stapling of printed documents. The final, illustrated system represent a plurality of output bins designated by bins 38 and 40.

Turning to the data processor unit C, included therein is a data input/output ("I/O") unit 40 which is in data communication with a central processor unit ("CPU") storage scheduling unit 42. A data path is provided between the data I/O unit 40 and each of the systems.

In the preferred embodiment, each system B includes therein a description associated with various functions and capabilities thereof. The data path between each of the illustrated systems and the data I/O unit allows for acquisition to the data processor unit C of all such descriptions. Data interconnections between the data I/O unit 40 of the data processor C and various systems B also allow for controller activation thereof.

Figure 2:
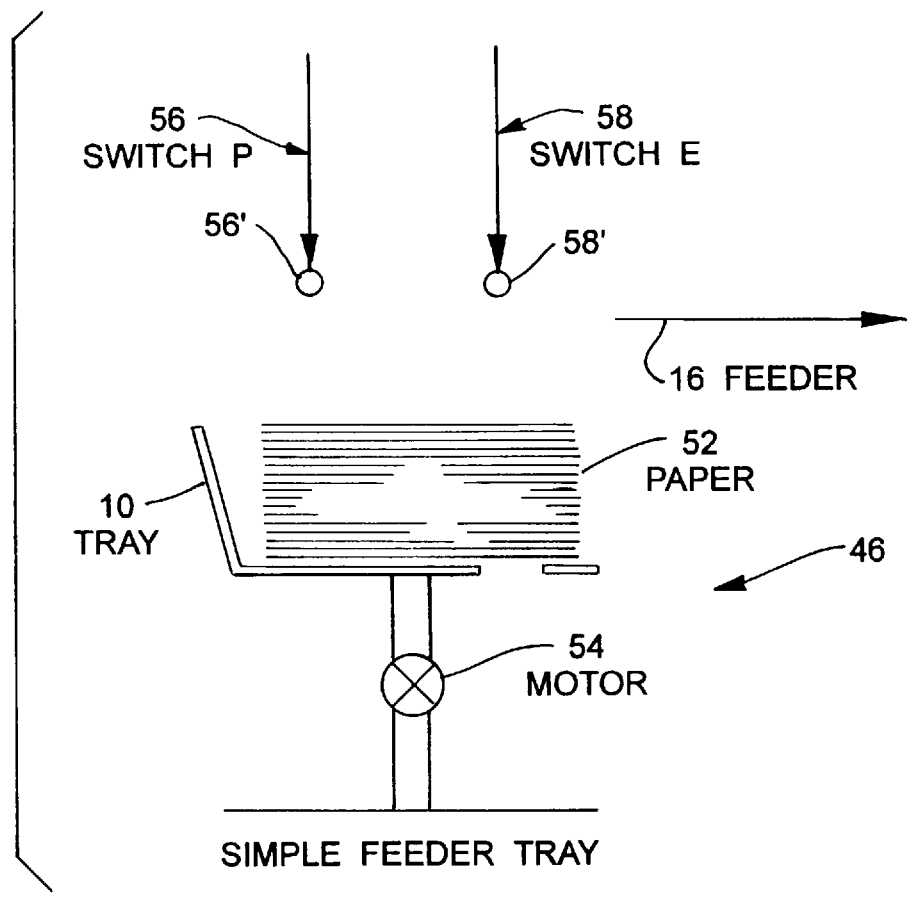
FIG. 2 is a schematic illustration of the paper supply system of the print engine according to FIG. 1.

FIG. 1 has been provided to show at least some of the systems which operate in concert to form print engine A. Various ones of these systems are electro-mechanical systems having a plurality of component parts. To now discuss the subject invention in greater detail, a paper supply system 46 is shown in FIG. 2, which includes among other components, tray 10, and feeder 16 of FIG. 1. Paper supply system 46 includes tray 10 having a flat surface on which stacks of paper 52 are placed. Tray 10 can be moved in a vertical direction by a constant velocity motor assembly 54. Some distance above tray 10 is switch (for paper) 56 and switch (for empty) 58. Switches 56 and 58 are mechanical switches, which are turned on if pushed up physically, for example by the stack of paper. There is a hole in the paper tray directly below switch 58. The switches are intended to be aligned, however, it is understood that some misalignment is possible and, therefore, as discussed later such misalignment is taken into consideration by the subject invention. When the paper hits either switch, that switch is turned on. Note that if there is no paper in the tray, switch 58 is not turned on, because of the hole in the tray. Feeder 16 is positioned at a position where, upon proper operation of paper supply system 46, paper 54 in tray 10 can be obtained by feeder 16 for further processing by other systems of print engine A.

With the above description of the individual components having been given, the paper supply system 46 generally operates as follows: upon a power-up situation (wherein the tray may not contain any paper), motor 54 begins operation moving the tray 10 in a vertical direction. Assuming there is paper in the tray, the switches 56 and 58 are turned on when the paper hits them. This indicates that paper 52 is in the tray 10 (switch 58) and that the paper is at an appropriate height (switches 56 and 58) such that feeder 16 can receive a sheet of the paper 52. It is to be appreciated that the motor in this example is powered-up under a timer sequence, such that if switch 56 and switch 58 do not sense a change within a certain time period, the motor is timed-out and, turned off. This feature is to protect switches 56 and 58 should there be a malfunction in the sensors and/or motor.

It is to be appreciated that the above description provides a general explanation of the operation of paper supply system 46 and other operation characteristics exist as will be expanded upon in the following description.

Figure 3:
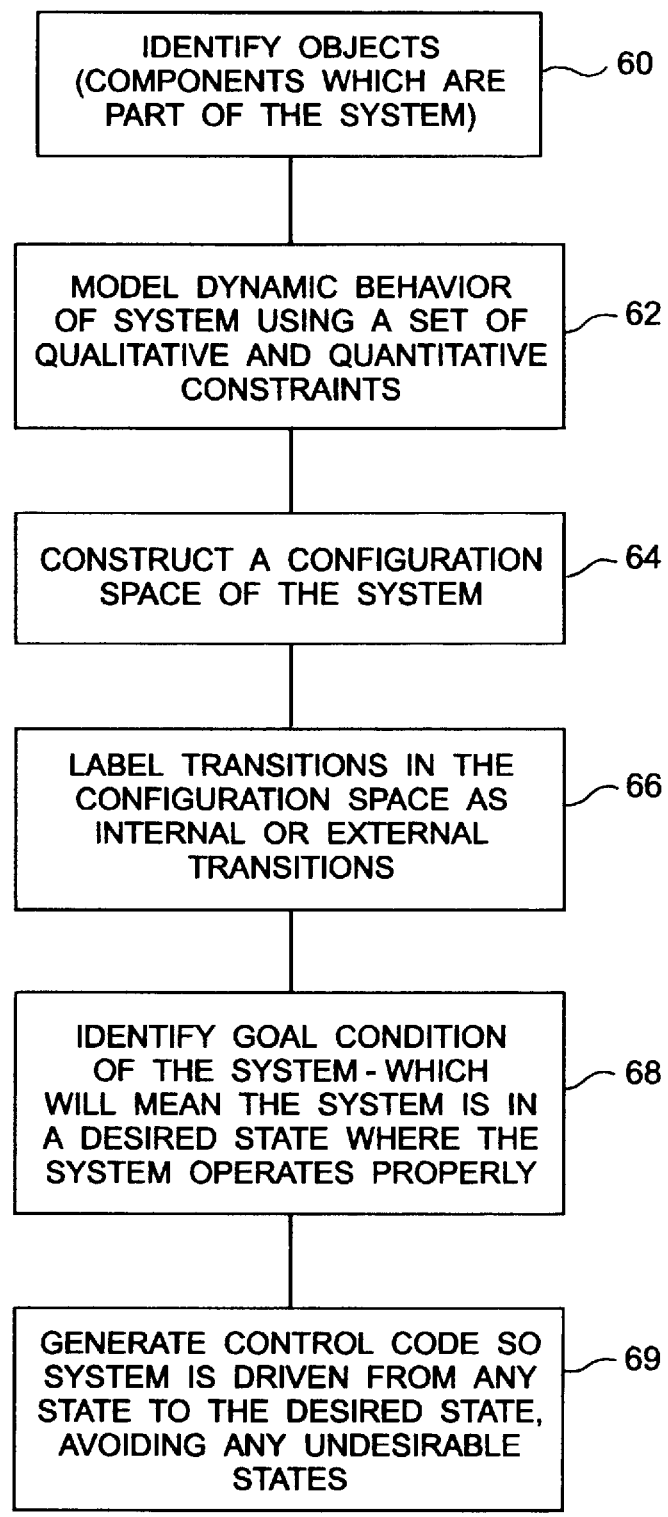
FIG. 3 is a flow chart detailing the ordering of operations to accomplish the automatic construction of a controller according to the subject invention.

Initially, automatic construction of the digital controllers/ device drivers according to the subject invention is achieved in a manner described by the flow chart of FIG. 3. Particularly, the components (i.e. sensors, motor, tray, paperfeeder, etc.) in the electro-mechanical system are identified 60. Next, the dynamic behavior of the system is modeled using a set of qualitative and quantitative constraints 62. The dynamic modeling of the system includes modeling the components of the system. The modeled dynamic behavior is then used to construct a configuration space for the system using a compilation algorithm 64. In this description, a configuration space is a set of states each of which represents a possible configuration of the system. For example, in the paper supply system 46, one configuration of the system would have motor 54 at its bottom position and tray 10 sitting at its minimal height. In this configuration, switches 56 and 58 are in an OFF state and feeder 16 is also OFF. Another configuration would be that the motor 54 is ON and has raised tray 10 up to a height such that switch 56 is tripped into an ON state. There are numerous types of configurations as well as transitions between such configurations. The sum of these configurations and transitions represent the configuration space. A configuration space is used to determine what states are reachable from an initial state, and under which of the transitions. Essentially, the configuration space is a finite state machine providing a succinct representation of all possible evolutions of the system.

With continuing reference to FIG. 3, upon generation of a configuration space, the transitions existing within such space are labeled as external or internal transitions 66. Internal transitions will take place due to the occurrence of an event which is under the control of the controller. On the other hand, external transitions occur due to events which are beyond the control of the system, but whose occurrence affects the operation of the system.

Thereafter, a "desired state" or "goal condition" of the system is identified 68. It is to be appreciated that the desired state can change over time, depending on the past history of interactions between the controlled system and its environment. Whereas, the desired state is the ultimate state of the system which is to be reached, "undesirable states" of a system are those configurations into which the system should not enter (e.g. a configuration which results in the damage of switches 56 and/or 58). Using the constructed configuration space, the labeled transitions, the identified desired state and identified undesirable states, a program is generated 69. The generated program drives the system from any state towards the desired state, avoiding the undesirable states. It is to be appreciated that various ones of the transitions will be dependent upon external variables (e.g. sensors turning ON and OFF, etc.), and some based on changes of internal variables (e.g. motor turning ON and OFF, etc.), and other transitions based on time-outs whose value is computed by the controller generator. Following the flow chart described in FIG. 3, digital controller/device drivers for electro-mechanical systems can be automatically constructed.

The above method combines concepts of qualitative reasoning for physical systems with techniques for automatic generation of code from finite state machine (FSM) descriptions.

As noted above, the method starts from a description of the components (e.g. motor, tray, switches, feeder and paper) and their interaction paths (i.e. transitions). By using qualitative envisionment of system 46, identification of crucial states of the system and transitions between the states are identified. The concepts of qualitative envisionment has been described for example in the document Qualitative Reasoning About Physical Systems, by Johan de Kleer and John Seely Brown, see Qualitative Physics Based on Confluences, MIT Press, 1985. Also published in AIJ, 1984.

Qualitative envisionment is commonly understood as the exploration of all potential behaviors of a system by, for example, repeatedly and in various ways exercising simulation or partial evaluation of its models. The resulting component behavior is comprised of an output produced by a particular behavior, inputs from which the output is produced, individual operations required to produce it (its "itinerary"), as well as various constraints on resources and timings to be observed when performing the operations. Some or all of this information may advantageously be precompiled. By way of example, this information may be compiled to finite state machine or configuration space described above.

In connection with FIG. 2, constraints of paper supply system 46 include that when sensors 56' and 58' are OFF, motor 54 causes paper tray 50 to rise in a vertical direction, and when both switches 56 and 58 are changed to an ON state, motor 54 will turn off. Other constraints include, timing constraints where after a certain time period without any change, the motor turns off. Still a further constraint acknowledges that sensors 56' and 58' may be at different heights. So even if the sensor of switch 58 (empty) is moved to an ON state, indicating the existence of paper in paper tray 10, the sensor of switch 56 (paper) may not be at the same height location. Therefore, a constraint condition needs to exist to compensate for height differences between sensors 56' and 58'.

In view of the above, it is necessary to develop a set of constraints which capture the different operations, errors, etc. of system 46.

FIG. 4 provides a representation of this physical scenario in Hybrid cc syntax. A discussion concerning the Hybrid cc language is set forth in the following section of this paper under the heading, Programming in hybrid constraint languages.

In Hybrid cc, intuitively, "," separates agents that are run in parallel, if c then A describes an agent that reduces to A if the constraint c holds in a current state, if c else A describes an agent that reduces to A if c will not be entailed in the current time instant, hence A executes a copy of A at every real time point after the current one, while always A executes a copy of A. The term do A watching c executes A until it sees a c, then A is immediately ended.

It is to be appreciated that while the present embodiment has used Hybrid cc language to represent the above physical scenario other languages may also be used.

The last four lines of FIG. 4 sets forth the desired state or goal condition 70a of system 46. The control statement 70b states that control of the motor (motor ON/motor OFF) are internal actions which can be controlled by the controller generated in the subject example. The desired state is when the feeder is equal to ON 70c, and an example of an undesirable state is one which would result in the breaking of switches 70d.

The system representation in FIG. 4 can be compiled into a configuration space using a compilation algorithm such as one described in the following section of this paper under the heading, Computing with continuous change. This compilation algorithm produces the set of configurations of the system, and the transitions between them. The finite state machine thus produced is a succinct representation of all possible evolutions of the system.

From the above description of FIG. 4 and having looked at the goal condition, each of the transitions between the configurations may be labeled as being caused by internal events or external events. It is further determined that some of the events will result in a "good" configuration which is desirable and which the system should be forced to reach, and some of the events are determined to cause "bad" configurations which are to be avoided (such as switches 56, 58 breaking).

To avoid the bad configurations, the system is forced to take a step such as switching the motor off after a certain time period (i.e. move to a state to avoid a bad configuration). Therefore, labeling each of the transitions will indicate internal events which the controller can control (i.e. switching motor ON/OFF) and external events, which are beyond control of the controller. After having labeled the transitions as being internal or external, the goal condition 70a is reviewed and it is determined that configurations in which the goal condition is true are "good" configurations. All the information necessary regarding the goal condition and the "good" or "bad" configurations is determined from the information in the configuration space.

Figure 5:
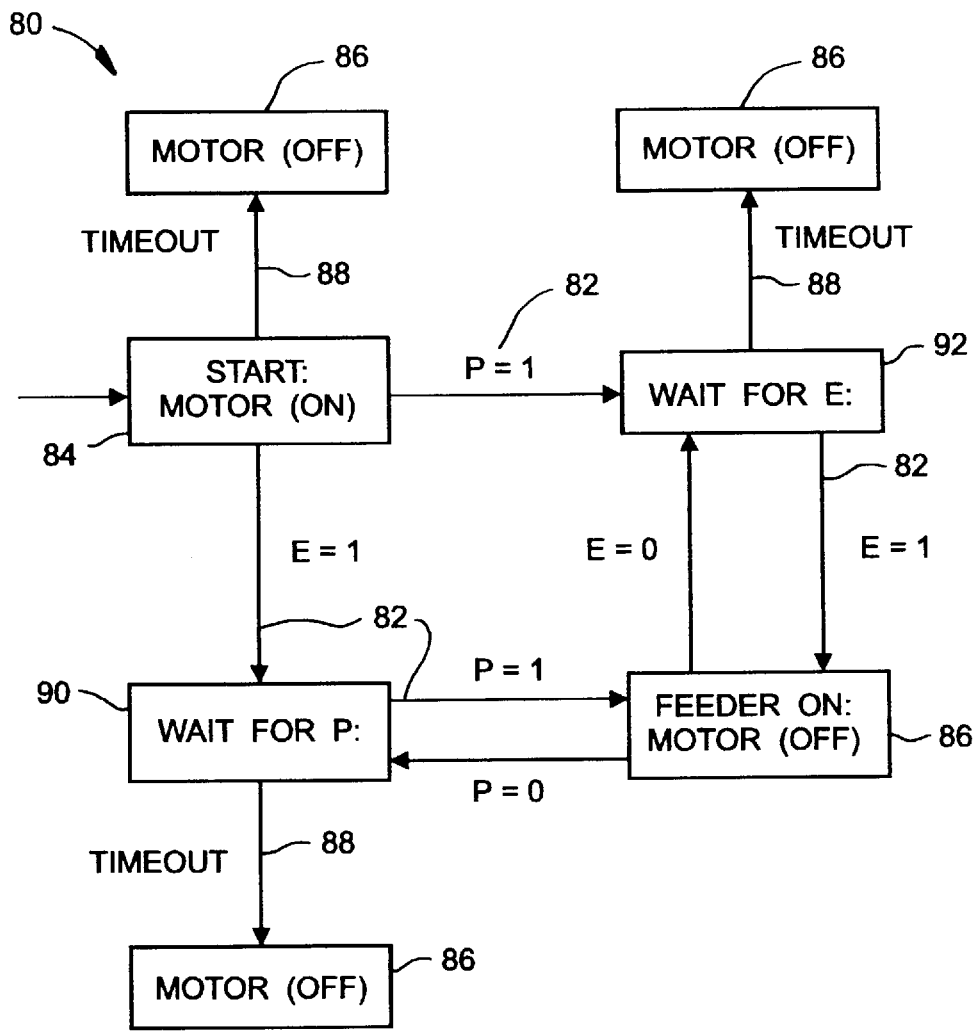
FIG. 5 is a block diagram depicting a finite state machine (FSM) for a controller constructed to control the paper supply system.

From the input model and prescribed goal condition of FIG. 4 an automaton/controller 80 of the form in FIG. 5 is produced. From this controller 80 it is shown that switches 56 and 58 are controlled externally 82, while the signals motor (on) 84, motor (off) 86, are generated by the controller 80. The values of the time-outs 88 are generated from the physical description of the code generation process.

The controller 80 is activated in a START state, which switches the motor ON. When one of the switches is tripped, the controller goes into a wait_for_P 90 or wait_for_E state 92, depending on which switch has been tripped. When the other switch is tripped, the feeder can be switched on until the paper level drops and one or both switches 56, 58 re-enter a state of 0. This is repeated until the paper tray 10 is empty, then switch 58 does not trip, and a time-out ensures that a message is sent to refill the paper. The other time-outs in the automaton controller 80 ensure that the motor does not run for an extended period of time which would cause the breaking of switches 56' and 58'.

Based on this automaton generated from the configuration space in FIG. 4, a separate, uniform compilation algorithm generates controller control code 94 as set forth in FIG. 6. The control code of the controller is used to force the operation represented by the automaton controller along a path. This control code is generated automatically from the configuration space description.

In many systems the state of the system is not known unambiguously, in such situations controller 80 is constructed so that at least some of its actions are directed to identifying the current state or otherwise reduce ambiguity, by moving to a known state.

In addition to the assumed correct function of the individual components, in another embodiment, knowledge is also incorporated regarding potential failure modes, for example, considering one possible fault in the system at a time.

It is also known that not all states can be sensed, so the system in yet another embodiment is implemented with some inference capabilities to determine whether the system is broken and, if so, what component may be at fault. Implementation of such an embodiment uses an extended description allowing an elaboration of the finite state machine to provide diagnostic information for possible failures.

The concepts of Hybrid cc constraint programming are more particularly set forth in the following sections entitled, Programming in hybrid constraint languages and Computing with Continuous Change.

Programming in hybrid constraint languages
1 Introduction and Motivation

The constant marketplace demand of ever greater functionality at ever lower price is forcing the artifacts of our industrial society designs to become ever more complex. Before the advent of silicon, this complexity would have been unmanageable. Now, the economics and power of digital computation make it the medium of choice for gluing together and controlling complex systems composed of electro-mechanical and computationally realized elements.

As a result, the construction of the software to implement, monitor, control and diagnose such systems has become a gargantuan, nearly impossible, task. For instance, traditional product development methods for reprographics systems (photo-copiers, printers) involve hundreds of systems engineers, mechanical designers, electrical, hardware and software engineers, working over tens of months through several hard-prototyping cycles. Software for controlling such systems is produced by hand—separate analyses are performed by the software, hardware and systems engineers, with substantial time being spent in group meetings and discussions coordinating different design decisions and changes, and assessing the impact these decisions will have on the several teams involved. Few, if any, automated tools are available to help in the production of documentation (principles of operation, module/system operating descriptions), or in the analysis and design of the product itself. A different team—often starting from little else than the product in a box, with little "documentation"—produces paper and computational systems to help field-service representatives diagnose and fix such products in the field.

Such work practices are unable to deal with the increasing demand for faster time to market, and for flexibility in product lines. Instead of producing one product, it is now necessary to produce a family of "plug-and-play" generic components—finishers (stackers, staplers, mailboxes), scanners, FAX modules, imaging systems, paper-trays, high-capacity feeders—that may come together for the very first time at customer-site. The software for controlling such systems must be produced in such a way that it can work even if the configuration to be controlled is known only at run-time.

To address some of these problems, we are investigating the application of model-based computing techniques. The central idea is to develop compositional, declarative models of the various components of a photo-copier product family, at different levels of granularity, customized for different tasks. For instance, a marker is viewed as a transducer that takes in (timed) streams of sheets S and video images V, to produce (timed) streams of prints P. A model for the marker, from the viewpoint of the scheduler, is a set of constraints that capture precisely the triples (S,V,P) which are in fact physically realizable on this marker. The marker model is itself constructed from models for nips, rollers, motors, belts, paper baffles, solenoids, control gates etc.; the models are hooked together in exactly the same way as the corresponding physical components are linked together. Together with this, software architectures are developed for the tasks that need to be accomplished (such as scheduling, simulation, machine control, diagnostic tree generation). Finally, linking the two are special-purpose reasoners (operating at "configuration-time") that produce information of the right kind for the given task architecture, given the component models and system configurations.

We expect this approach to be useful for a variety of tasks:

Scheduling. A model of the system specifies what outputs will be produced given (perhaps continuous) input and control commands. In principle, the same model can be used to search the space of inputs and control commands, given a description of system output. In practice, the design of such an inference engine is made complex by the inherent combinatorial complexity of the search process. With a formal model in hand, it becomes possible to use automated techniques to better understand the search-space and design special-purpose reasoners. This approach is currently being deployed, in collaboration with several other teams, in the development of schedulers for a new generation of products from Xerox Corporation.

Code Generation. A physical model of a system can be used for envisionments—studying the possible paths of evolution of the system. Since some of the parameters of a system can be controlled, it becomes possible to develop automatically controllers which would specify these parameters leading the system to a desirable state, and away from paths which lead to unsafe states.

Diagnostic-tree generation. Given a model of components, their interconnection, and their correct (and possibly faulty) behavior—perhaps with other information such as prior probabilities for failure—it is possible to construct off-line repair-action procedures. These can be used by service technicians as guides in making probes to determine root cause for the manifest symptom.

Explanation. Given a simulation-based model, it is possible to annotate behavioral rules with text in such a way that the text can be systematically composed to provide natural-language explanations for why an observable parameter does or does not have a particular value.

Productivity Analysis. Models may be analyzed to determine how corresponding product designs will perform on different job mixes (e.g., a sequence of all single-sided black & white jobs, followed by all double-sided, color, stapled jobs).

The model-based computing approach places a set of requirements on the nature of the modeling language. We motivate these demands by considering a concrete example—the paper path of a simple photocopy as illustrated in FIG. 7.

EXAMPLE 1

Paper Transportation in a Photocopier

Figure 7:
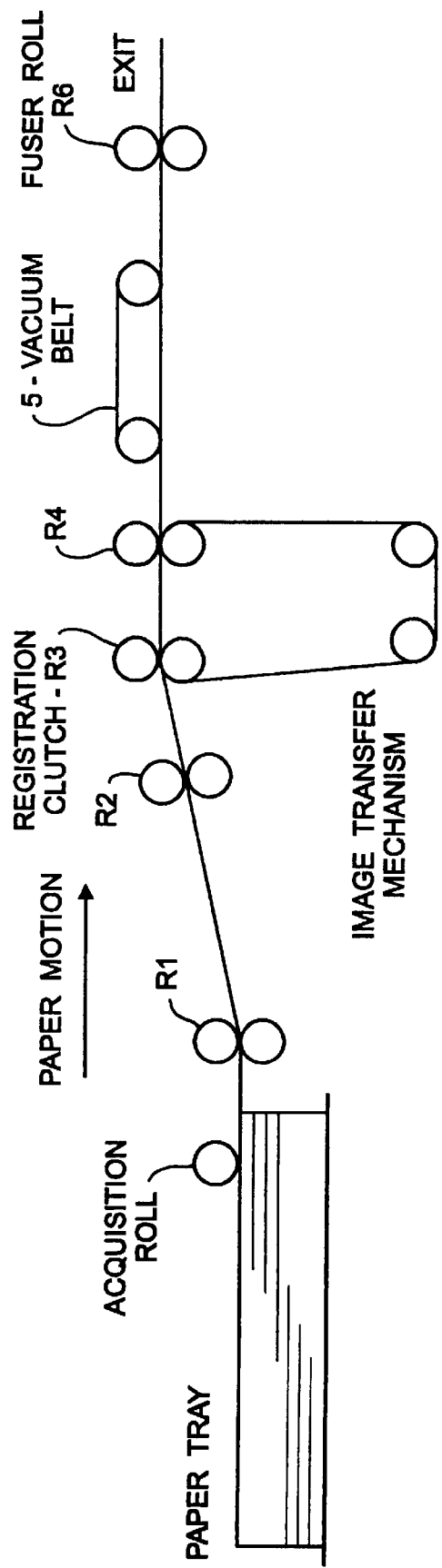
FIG. 7 is a simplified illustration of a photocopier configuration used in connection with the discussion of the Hybrid cc language.

In the photocopier of FIG. 7, paper is loaded in a paper tray at the left of the machine. When a signal is received, the acquisition roll (Acq Roll) is lowered onto the paper and pulls the top sheet of paper towards the first set of rollers (R1). After the paper is grasped by the first set of rollers, the acquisition roll (Acq Roll) is lifted, and the rollers (R2,R4) pull the paper forward, till it reaches the registration clutch (R3). This starts at a precise moment for prefect alignment with the toner image on the belt. The toner is transferred electrostatically onto the paper by the image transfer mechanism. The vacuum belt (5) transports it to the fuser roll (R6) which fuses the toner into the paper, and from there it exists.

Hybrid modeling

The photocopier of FIG. 7 has a collection of components with continuous behavior, for example, the rollers and belts. The control program of the photocopier is a discrete event driven system. Therefore, the modeling language should be able to describe the interaction of the control program and the continuous components—thus, the modeling language has to fall in the framework of hybrid systems.

Executability

Given a model of the system, it should be possible to predict the behavior of the system when inputs are supplied. Thus, the model should be executable, i.e. it should also be possible to view models as programs. This would allow hybrid control programs to be written using the same notation as component models. If sensors and actuators coupling the language implementation with the physical environment are provided then, in fact, it should be possible to use programs in this notation to drive physical mechanisms.

Compositional modeling

Out of consideration of reuse, it seems clear that models of composite systems should be built up from models of the components, and that models of components should reflect their physics, without reflecting any pre-compiled knowledge of the structure (configurations) in which they will be used (the "no function in structure principle"). Concretely, this implies that the modeling language must be expressive enough to modularly describe and support extant control architectures and techniques for compositional design of hybrid systems. From a programming language standpoint, these modularity concerns are addressed by the analysis underlying synchronous programming language, (adapted to dense discrete domains); this analysis leads to the following demands on the modeling language.

The modeling should support the interconnection of different components, and allow for the hiding of these interconnections. For example, the model of the copier is the composition of the control program and the model of the paper path. The model of the paper path in turn, is the composition of the models of the rollers, clutches, etc.

Furthermore, in the photocopier example, if paper jams, the control program should cause the rollers to stop. However, the model of the rollers, in isolation, does not need to have any knowledge of potential error conditions. Thus, the modeling language should support orthogonal preemption—any signal can cause preemption.

Finally, the language should allow the expression of multiple notions of logical time—for example, in the photocopier the notice of time relevant to the paper tray is (occurrences of) the event of removing paper from the tray; the notion of time relevant to the acquisition roll is determined by the rotation rate of the roller; the notion of time of the image transfer mechanism is the duration of the action of transferring images etc.

Thus, we demand that the modeling language be an algebra of processes, that includes concurrency, hiding, preemption and multiform time.

Declarative view

It must be possible for systems engineers—people quite different in training and background from software engineers—to use such a formalism. Typically, systems engineers understand the physics of the system being designed or analyzed, and are used to mathematical or constraint-based formalisms (equational and algebraic models, transfer functions, differential equations) for expressing that knowledge. This suggests that it must be possible to view a model (fragment) expressed in the language as a declaration of facts in a (real-time) (temporal) logic.

Reasoning

Given a model of the paper-path, and the control procedures governing it, it should be possible to perform a tolerance analysis—establish the windows on an early/late arrival of sheets of papers at various sensors on the paper-path, given that a particular physical component may exhibit any behavior within a specified tolerance. This, and other such engineering tasks, suggest that the modeling language must be amenable to (adapting) the methodology developed in the extensive research on reasoning about hybrid and real-time systems—for example, specification and verification of properties of hybrid systems, qualitative reasoning about physical systems, and envisionment of qualitative states.

1.1 This discussion

This discussion describes programming in the modeling language, Hybrid cc—hybrid concurrent constraint programming. Intuitively, Hybrid cc is obtained by "freely extending" an untimed non-monotonic language Default cc over continuous time. Hybrid cc has the following key features:

The notion of a continuous constraint system describes the continuous evolution of system trajectories.

Hybrid constraint languages—developed generically over continuous constraint systems are obtained by adding a single temporal construct, called hence. Intuitively, a formula hence A is read as asserting that A holds continuously beyond the current instant.

Continuous variants of preemption-based control constructs and multiform timing constructs are definable in Hybrid cc.

The formula foundations of Hybrid cc are discussed in the following discussion computing with continous change.

The rest of this discussion is organized as follows. First, we describe the computational intuitions underlying Hybrid cc. We follow with a brief description of an interpreter for a language in the Hybrid cc framework. We then describe a series of examples, and show traces of the execution of the interpreter. These examples illustrate the programming idioms and expressiveness of Hybrid cc.

2 Hybrid cc: Computational Intuitions 2.1 Background

Concurrent Constraint Programming

As mentioned in the previous section, some of the crucial characteristics in a hybrid programming language are easy specification and composition of model fragments. This led us to consider Concurrent Constraint Programming languages as a starting point, since these languages are built on top of constraint systems, which can be made as expressive as desired, and they have very fine-grained concurrency, so compositionality is achieved without effort. Recently, several concrete general-purpose programming languages have been implemented in this paradigm.

Concurrent Constraint Programming (cc) languages are declarative concurrent languages, where each construct is a logical formula. cc replaces the traditional notion of a store as a valuation of variables with the notion of a store as a constraint on the possible values of variables. Thus the store consists of pieces of information which restrict the possible values of the variables. A cc program consists of a set of agents (we use the words agent and program interchangeably in this paper, usually referring to fragments of a program as agents) running concurrently and interacting with the shared store. Agents are of two basic kinds—tell agents which add information to the store (written a) and ask agents, or conditionals (written if a then A), which query the store about the validity of some information, and reduce to other agents if it is valid. (There are also hiding agents new X in A which hide any information about X from everyone else, these are needed for modularity.) This yields the grammar:

A::=a|if a then A|new X in A|A,A

Computation is monotonic—information can only be added to the store. Ask actions are used for synchronization—if a query is answered positively, then the agent can proceed, otherwise it waits (possibly forever) till there is enough information in the store to entail the information in the query. When no more computation is being performed (a state of quiescence is reached), the store is output.

The information that is added to the store consists of constraints which are drawn from a constraint system. Formally, a constraint system C is a system of partial information, consisting of a set of primitive constraints or tokens (Tokens are denoted by a, b, . . . in this discussion) D with minimal first order structure—variables and existential quantification. Associated with a constraint system is an entailment relation (denoted $\vdash_c$) which specifies when a token a can be deduced from some others $b_a, \ldots b_n$, denoted by $b_a, \ldots b_n \vdash ca$. Examples of such systems are the system herbrand, underlying logic programming—here tokens are equalities over terms which are finite trees with variables ranging over trees—and FD or finite domains, its tokens are equalities of variables and expressions saying that the range of a variable is some finite set.

A salient aspect of the cc computation model is that agents may be thought of as imposing constraints on the evolution of the system. The agent a imposes the constraint a. (A,B) imposes the constraints of both A and B-logically, this is the conjunction of A and B. new X in A imposes the constraints of A, but hides the variable X from the other agents—logically, this can be thought of as a form of existential quantification. The agent if a then A imposes the constraints of A provided that the rest of the system imposes the constraints a—logically, this can be thought of as intuitionist implication.

This declarative way of looking at programs is complemented by an operational view. The basic idea in the operational view is that of a network of agents interacting with a shared store of primitive constraints. The agent a is viewed as adding a to the store instantaneously. (A,B) behaves like the simultaneous execution of both A and B. new X in A starts A but creates a new local variable X, so no information can be communicated on it outside. The agent if a then A behaves like A if the current store entails a.

The main difficultly in using cc languages in modeling is that the cc programs can detect only the presence of information, not its absence. However, in reactive systems, it is important to handle information saying that a certain event did not occur—examples are timeouts in UNIX or the presence of jams in photocopier (usually inferred by the paper not reaching a point by some specified time). The problem in assuming the absence of information (called negative information) during a computation is that it may be invalidated later when someone else adds that information, leading to invalidation of the subsequent computation.

Our first attempt at fixing this problem was the addition of a sequence of phases of execution to the cc paradigm. At each phase we executed a cc program, and this gave the output for the phase, and also produced the agents to be executed in subsequent phases. At the end of each phase we detected the absence of information, and used it in the next phase, giving us a reactive reprogramming language, tcc. Each phase was denoted by a time tick, so we had a discrete model of time.

Default cc. The addition of time to cc however still left us with a problem—how can we detect negative information instantaneously? This is necessary because in some applications we found that it was not acceptable to wait until the next phase to utilize negative information.

Since the negative information is to be detected in the same time step, it must be done at the level of the untimed language, cc. However, the cc paradigm is inherently opposed to instantaneous negative information detection. Thus in order to allow negative information to be detected within the same computation cycle, we have to modify cc—we have to use Default cc. The basic idea behind Default cc is—if the final output of a computation is known, then any negative information can be obtained from this output, and this negative information can never be invalidated, as the final output has all the information ever added. So a Default cc program executes like a cc program, except that before the beginning of the execution, it guesses the output store. All negative information requests are resolved with respect to this guess, other than the Default cc program adds information to the store and queries the store for positive information just like a cc program. At the end of the computation, if the store is equal to the guess, then the guess was correct, and this is a valid answer. Otherwise, this branch of execution is terminated (or we can do backtracking). In an actual implementation, this backtracking is done at compile time, so at runtime we have to do a simple table look-up.

The Default cc paradigm augments the cc paradigm with the ability to detect negative information, so the only new syntax we need to add to the cc syntax is the negative ask combinator if a else A, this reduces to A if the guessed output e does not imply a. Thus the Default cc syntax is given by the grammar A::=a|if a then A|A,A|new X in A|if a else A The agent if a else A imposes the constraints of A unless the rest of the system imposes the constraint a—logically, this can be thought of as a default. Note that if a else A is quite distinct from the agent if→a then A (assuming that the constraint system is closed under negation). The former will reduce to A if the final store does not entail a; the latter will reduce to A if the final store entails→a. The difference arises because, by their very nature, stores can contain partial information; they may not be strong enough to entail either a or→a. (In the time contexts discussed below, the subtlety of the non-monotonic behavior of programs—intimately related to the casualty issues in synchronous programming languages—arises from this combinator.) To see this, note that A may itself cause further information to be added to the store at the current time instant; and indeed, several other agents may simultaneously be active and adding more information to the store. Therefore requiring that information a be absent amounts to making a demand on "stability" of negative information.

Thus we now have a language that permits instantaneous negative information detection. This enables us to write strong timeouts—if a signal is not produced at a certain time, the execution of the program can be terminated at that very time, not at some later time as we did for timed cc. Now in order to get a language for modeling discrete reactive systems, we again introduce phases in each of which a Default cc program executes. To extend Default cc across time, we need just one more construct, hence A, which starts a copy of A in each phase after the current one. We extend Default cc across real time to get a language for hybrid reactive systems in the next subsection.

2.2 Continuous evolution over time

We follow a similar intuition in developing Hybrid cc: the continuous timed language is obtained by uniformly extending Default cc across real (continuous) time. This is accomplished by two technical developments.

Continuous Constraint Systems

First, we enrich the underlying notion of constraint system to make it possible to describe the continuous evolution of state. Intuitively, we allow constraints expressing initial value (integration) problems, e.g. constraints of the form $X=O_1$, hence $dot(X)=1$; from these we can infer at time that $X=t$. The technical innovation here is the presentation of a generic notion of continuous constraint system (ccs), which builds into the very general notion of constraint systems just the extra structure needed to enable the definition of continuous control constructs (without committing to a particular choice of vocabulary for constraints involving continuous time). As a result subsequent development is parametric on the underlying constraint language: for each choice of a ccs we get a hybrid programming language. Later we will give an example of a simple constraint system and the language built over it.

Program Combinators

Second we add to the untimed Default cc the same temporal control construct: hence A, but now interpreting it over real time. Declaratively, hence A imposes the constraints of A at every real time instant after the current one. Operationally, if hence is invoked at time t, a new copy of A is invoked at each instant in (t,oo).

| Agents | Propositions |
|---|---|
| a | a holds now |
| if a then A | if a holds now, then A holds now |
| if a else A | if a will not hold now, then A holds now |
| new X in A | exists an instance A[t/X] that holds now |
| A, B | both A and B hold now |
| hence A | A holds at every instant after now |

Intuitively, hence might appear to be a very specialized construct, since it requires repetition of the same program at every subsequent time instant. However, hence can combine in very powerful ways with positive and negative ask operations to yield rich patterns of temporal evolution. The key idea is that negative asks allow the instantaneous preemption of a program—hence, a program hence if P else A will in fact not execute A at all of those time instants at which P is true.

Let us consider some concrete examples. Suppose that we require that an agent A be executed at every time point beyond the current one until the time at which a is true. This can be expressed as new X in (hence (if X else A, if, a then always X)). Intuitively, at every time point beyond the current one, the condition X is checked. Unless it holds, A is executed. X is local—the only way it can be generated is by the other agent (if a then always X) which, in fact generates X continuously if it generates it at all. Thus, a copy of A is executed at each time point beyond the current one upto (and excluding) the time at which a is detected.

Similarly, to execute A precisely at the first time instant (assuming there is one) at which a holds, execute: new X in hence (if X else if a then A, if a then hence X).

In particular, the continuous version of the general preemption control construct clock is definable within Hybrid cc. The patterns of temporal behavior described above are obtainable as specializations of clock. Further, programs containing the clock combinator may be equationally rewritten into programs not containing the combinator.

While conceptually simple to understand, hence A requires the execution of A at every subsequent real time instant. Such a powerful combinator may seem impossible to implement computationally. For example, it may be possible to express programs of the form new T in (T=0, hence dot(T)=1, hence if rational (T) then A) which require the execution of A at every rational q>0. Such programs are not implementable. To make Hybrid cc computationally realizable, the basic intuition we exploit is that, in general, physical systems change slowly, with points of discontinuous change, followed by periods of continuous evolution. This is captured by a stability condition on continuous constraint systems that guarantees that for every constraint a and b there is a neighborhood around 0 in which a either entails or disentails b at every point. This rules out constraints such as rational (T) as inadmissible.

With this restriction, computation in Hybrid cc may be thought of as progressing in alternating phases of computation at a time point, and in an open interval. Computation at the time point establishes the constraint in effect at that instant, and sets up the program to execute subsequently. Computation in the succeeding open interval determines the length of the interval r and the constraint whose continuous evolution over (O,r) describes the state of the system over (0,r).

3 The Implementation

We will now present a simple implementation for Hybrid cc built on top of a simple continuous constraint system. The interpreter is built on top of Prolog, and consideration has been given to simplicity rather than efficiency. We have already identified several ways in which performance can be significantly enhanced using standard logic programming techniques.

3.1 The continuous constraint system

Basic tokens are formulas d, hence d or prev (d), where d is either an atomic proposition p or an equation of the form dot(x,m)=r, for x a variable, m a non-negative integer and r a real number. Tokens consist of basic tokens closed under conjunction and existential quantification. Some rudimentary arithmetic can be done using the underlying prolog primitives. The inference relations are defined in the obvious way under the interpretation that p states that p is true and dot(x,m)=r states that the mth derivative of x is r.prev(d) asserts that d was true in the limit from the left, and hence d states that for all time t>0 d holds. The inference relations are trivially decidable: the functions of time expressible are exactly the polynomials. The only non-trivial computation involved is that of finding the smallest non-negative root of univariate polynomials (this can be done using one of several numerical methods).

3.2 The basic interpreter

The interpreter simply implements the formal operational semantics discussed in detail in [GJSB95]. It operates alternately in point and interval phases, passing information from one to the other as one phase ends. All discrete change takes place in the point state, which executes a simple Default cc program. In a continuous phase computation progresses only through the evolution of time. The interval state is exited as soon as the status of one of the conditionals changes—one which always fired does not fire anymore, or one starts firing.

The interpreter takes a Hybrid cc program and starts in the point phase with time t=0.

The point phase

The input to the point phase is a set of Hybrid cc agents and a prev store, which carries information from the previous interval phase—the atomic propositions and the values of the variables at the right endpoint of the interval (initially at time 0 this is empty). The outputs are the store at the current instant, which is printed out and passed on to the next interval phase as the initial store, and the agent or the continuation, to be executed in the interval phase.

The interpreter takes each agent one by one and processes it. It maintains the store as a pair of lists—the first list contains the atomic propositions that are known to be true at the point, and the second contains a list of variables and the information that is known about the values of their derivatives. It also maintains lists of suspended conditionals (if . . . then and if . . . else statements whose constraints are not yet known to be true or false) and a list of agents to be executed at the next interval phase.

When a tell action (a constraint a) is seen, it is added to the store and a check for consistency is made. If the constraint is of the form dot(x,m)=r, then it means that all derivatives of x of order <m are continuous, and thus their values are copies from the prev store. Any conditional agents that have been suspended on a are reactivated and placed in the pool of active agents.

When any conditional agent appears, its constraint is immediately checked for validity. If this can be determined, the appropriate action is taken on the consequence of the agent—it is discarded or added to the pool of active agents. Otherwise it is added to an indexed list of suspended conditionals for future processing. A hence action is placed in the list of agents to be executed in the next interval.

When no more active agents are left, the interpreter looks at the suspended agents of the form if a else A, the defaults. On successful termination, one of two conditions must hold for each such agent: either the final store entails a, or else the final store incorporates the effect of executing A. Thus all that the interpreter has to do is to non-deterministically choose one alternative for each such default. In the current implementation, this non-deterministic choice is implemented by backtracking, with execution in the current phase terminating with the first successful branch.

The interval phase

This is quite similar to the point phase, except that it also has to return the duration of the phase. The input is a set of agents and an initial store which determines the initial values for the differential equations true in the store. The output is a set of agents to be executed in the next point phase, a store giving the values of the variables at the end of the interval phase, and the length of the phase. Initially, we assume that the length will be infinite, this is trimmed down during the execution of the phase.

A tell is processed as before—it is added to a similar store, and reactivates any suspended conditionals. Conditional agents are added to the suspended list if their conditions re not known to be valid or invalid yet, otherwise the consequence of the agent is added to the active pool or discarded. In addition, if the condition can be decided, then we compute the duration for which the status will hold. For example if we have dot(x,1)=3 in the store, and x=4 in the initial store, then we know that x=3t+4. Now if we ask if (x=10) then A, then we immediately know that this is not true in the current interval, so A can be discarded for now. However, we also know, by solving the equation 3t+4=10 that this status will hold for only 2 seconds, so this interval phase cannot be longer than two seconds. (This is where we need to solve the polynomial equations.)

At the end of the processing, the defaults are processed as before, and are used to trim the length of the interval phase further. Also, the remaining suspended conditionals if a then . . . are checked to when a could first become valid, to reduce the duration of the phase if necessary. Finally a computation is done to find the store at the end of the interval, and this information is passed to the next point phase. Since all agents are of the form hence A in an interval phase, the agent to be executed at the next point phase must be A, hence A.

If any interval phase has no agents to execute, the program terminates.

3.3 Combinators

This basic syntax of Hybrid cc has been quite enough for us to write all the programs that we have. However, we have noticed several recurrent patterns in our programs, and some of these can be written up as definable combinators, and make the job of programming considerably easier. Note that these are defined combinators, i.e. they are definable in terms of the basic combinators. Thus, these defined combinators are merely syntactic sugar, and can be compiled away into basic combinators.

Always always A=A, hence A is read logically as □A, the necessity modality. Parameter less recursion can be mimicked—replace a recursive process P::body by always if P then body. Parameters can be handled by textual substitution.

Waiting for a condition whenever a do A reduces to A at the first time instant that a becomes true—if there is a well-defined notion of first occurrence of a. Note that there is no "first" occurrence of a in the situation when the a occurs in the interval (0,t), as happens in the agent hence a. In such cases, A will not be invoked. whenever can be defined in terms of the basic combinators as mentioned in the previous section.

In the following discussion of definable combinators, and in the rest of this paper, we shall not repeat the caveat about the subtlety of the well-definedness of the "first" occurrences of events.

Watchdogs do A watching a, read logically as "A until a", is the strong abortion interrupt of ESTEREL. The familiar cntrl-C is a construct in this vein. do A watching a behaves like A until the first time instant when a is entailed: when a is entailed A is killed instantaneously. It can be defined using the basic constructs as follows:

do b watching a = if a else b
di if b then A watching a = if b then do A watching b
do if b else A watching a = if b else do A watching a
do A,B watching a = do A watching a, do B watching a
do new X in A watching a = new X in do A watching a X not free in a
do hence A watching a = new X in (hence [if X else do A watching a, if a then hence X])

Multiform time time A on a denotes a process whose notion of time is the occurrence of a-A evolves only the store entails a. It can be defined by structural induction as above.

Implementation of the defined constructs

The laws given above suffice to implement all these constructs in the interpreter. However, for the sake of efficiency, we have implemented the constructs directly, at the same level as basic constructs. The always construct is of course trivial, and has been implemented using the given rule. whenever is implemented similarly to an if a then A construct, except that if a is not entailed, then it is carried across to the next phase. It has no effect in an interval phase for the reason mentioned above.

do A watching a is very similar to an if b else B, and is implemented analogously. The only thing to be noted here is that whenever something from the A is to be passed on to the next phase, it must be passed inside a do . . . watching a, so that the proper termination of all spawned agents can be achieved when a becomes true. time A on a is similar—it is like an if a then A, remembering the same rule about passing spawned agents through phases.

4 Programming examples

We illustrate the programming/model description style of Hybrid cc via a few examples. In each of these examples, we write each of the conceptually distinct components separately. We then exploit the expressive power of Hybrid cc to combine the subprograms (submodels) via appropriate combinators, to get the complete program/model. We also present the trace of the interpreter on some of these examples.

4.1 Sawtooth function

We start off with a simple example, the sawtooth function defined as f(y)=y−[y], where [y] denotes the greatest integer in y.

As mentioned above, prev(x=1.0) is read as asserting that the left limit of x equals 1.

```
sawtooth::
    x = 0,
    hence (if prev(x = 1.0) then x = 0),
    hence (if prev(x = 1.0) else dot(x) = 1)).
```

The trace of this program as executed by our interpreter is seen below. The execution in the point and interval phases is displayed separately. For both phases of execution, the contents of the store are displayed. In addition, for the interval phase, the interval is also displayed, and the continuous variables are displayed as polynomials in time. In the interval, note that time is always measured from the beginning of the interval, not from 0. Also, this program has infinite output, so we aborted it after some time.

Time=0
Store contains [dot (x,0)=0].
Time Interval is (0, 1.0)
Store contains [x=1*t+0]
Time=1.0
Store contains [dot(x,0)=0].
Time Interval is (1.0, 2.0)
Store contains [x=1*t+0].
Time=2.0.
Store contains [dot(x,0)=0].
Time Interval is (2.0, 3.0)
Store contains [x=1*t+0].
Time=3.0.
Store contains [dot(x,0)=0].
Prolog interruption (h for help)? a {Execution aborted}
|?-

4.2 Temperature Controller

We model a simple room heating system which consists of a furnace which supplies heat, and a controller which turns it on and off. The temperature of the furnace is denoted temp. The furnace is either on (modeled by the signal furnace_on) or off (modeled by the signal furnace_off). The actual switching is modeled by the signals switch_on and switch_off. When the furnace is on, the temperature rises at a given rate, HeatR. When the furnace is off, the temperature falls at a given rate, CoolR. The controller detects the temperature of the furnace, and switches the furnace on and off as the temperature reaches certain prespecified thresholds; Cut_out is the maximum temperature and Cut_in is the minimum temperature.

The heating of the furnace is modeled by the following program. The multiform time construct ensures that heating occurs only when the signal furnace_on is present.

furnace_heat(HeatR)::time (always dot(temp)=HeatR) on furnace_on.

The cooling of the furnace is modeled by the following program. The multiform time construct ensures that heating occurs only when the signal furnace_off is present.

furnace_cool(CoolR)::time (always dot(temp)=-CoolR) on furnace_off.

The furnace itself is the parallel composition of the heating and cooling programs.

furnace (HeatR, CoolR)::furnace_heat (HeatR), furnace_cool (CoolR).

The controller is modeled by the following program—at any instant, the program watches for the thresholds to be exceeded, and turns the appropriate switch on or off.

```
controller(Cut_out, Cut_in)::
always (if switch_on then do (always furnace_on) watching switch_off,
   if switch_off then do (always furnace_off) watching switch_on,
   if prev(temp = Cut_out) then switch_off,
   if prev(temp = Cut_in) then switch_on).
```

The entire assembly is defined by the parallel composition of the furnace and the controller.

controlled_furnace (HeatR, CoolR, Cut_out, Cut_in)::
(furnace (HeatR, CoolR), controller (Cut_out, Cut_in)).

The trace of this program with parameters HeatR=2, CoolR=-0.5, Cut_Out=30, Cut_in=26 and initial conditions temp=26 and the signal switch_on, as executed by our interpreter is seen below.

Time=0.
Store contains [furnace_on, switch_on, dot(temp,1)=2.0, dot(temp,0)=26.0].
Time Interval is (0, 2.0)
Store contains [furnace_on, temp=2.0*t+26.0].
Time=2.0.
Store contains [furnace_off, switch_off, dot(temp,1)=-0.5, dot(temp,0)=30.0].
Time Interval is (2.0, 10.0)
Store contains [furnace_off, temp=-0.5*t+30.0].
Time=10.0.
Store contains [furnace_on, switch_on, dot(temp,1)=2.0, dot(temp,0)=26.0].
Time Interval is (10.0, 12.0)
Store contains [furnace_on, temp=2.0*t+26.0].
Prolog interruption (h for help)? a
{Execution aborted}

4.3 Cat and Mouse

Next, we consider the example of a cat chasing a mouse. A mouse starts at the origin, running at speed 10 meters/second for a hole 100 meters away. After it has traveled 50 meters, a cat is released, that runs at a speed 20 meters/second after the mouse. The positions of the cat and the mouse are modeled by c and m respectively. The cat wins (modeled by the signal wincat) if it catches the mouse before the hole, and loses otherwise (modeled by the signal winmouse).

The cat and the mouse are modeled quite simply. The positions of the cat and the mouse change according to the respective velocities. Note that there is no reference to the cat or the position of the hole in the mouse program; similarly for the cat program. This is essential for reuse of these models.

mouse::M=0, always dot(M)=10.

cat::C=0, always dot(C)=20.

The entire system is given by the assembly of the components. The mouse wins if it reaches the hole m=100; the cat wins if c=100 and the mouse has not reached the hole. The combination do ( . . . ) watching prev (m=100), whenever m=100 do is used as an exception handler; it handles the case of the mouse reaching the hole. Similarly, the combination do ( . . . ) watching prev (c=100)), whenever prev (c=100) do is used as an exception handler; it handles the case of the cat reaching hole. The higher priority of do . . . watching prev (c=100) relative to do ( . . . ) watching prev (m=100) is captured by lexical nesting—in this program the cat catches the mouse if both reach the hole simultaneously.

```
system_ configuration ::
   do (do (mouse,
         whenever prev (m = 50) do cat)
      watching prev (m = 100,
         whenever prev (m = 100) do winmouse)
      watching prev (c = 100),
         whenever prev (c = 100) do wincat.
```

A trace of this program as executed by the interpreter is given below:

Time=0.
Store contains [dot(m,1)=10, dot(m,0)=0].
Time Interval is (0, 5.0)
Store contains [m=10*t+0].
Time=5.0.
Store contains [dot(m,1)=10, dot(m,0)=50.0, dot(c,1)-20, dot(c,0)=0].
Time Interval is (5.0, 10.0)
Store contains [c=20*t+0, m-10*t+50.0].
Time=10.0.
Store contains [wincat].
Termination after Time 10.0.
Initial Conditions: [wincat].
Store has [ ].
yes The other alternative, i.e., the mouse wins if the cat and the mouse reach the hole simultaneously is captured by reversing the lexical nesting of do ( . . . ) watching prev (m=100) and do ( . . . ) watching prev (c=100). Concretely, the program is:

```
system_configuration ::
   do (do (mouse
         whenever prev(m = 60 do cat)
      watching prev(c = 100),
         whenever prev(c = 100) do wincat)
      watching prev(m = 100),
         whenever prev(m = 100) do winmouse.
```

A trace of this program as executed by the interpreter is given below:

Time=0.
Store contains [dot(m,1)=10,dot(m,0)=0].
Time Interval is (0, 5.0)
Store contains [m=10*t+0].

Time=5.0.

Store contains {dot(m,1)=10,dot(m,0)=50.0,dot(c,1)=20, dot (c,0)=0].

Time Interval is (5.0) 10.0)

Store contains [c=20*t+0,m=10*+50.0].

Time=10.0.

Store contains [winmouse].

Termination after Time 10.0.

Initial Conditions: [winmouse].

Store has [ ].

yes

4.4 A simple game of Billiards

We model a billiards (pool) table with several balls. The balls roll in a straight line till a collision with another ball or an edge occurs. When a collision occurs the velocity of the balls involved changes discretely. When a ball falls into a pocket, it disappears from the game. For simplicity, we assume that all balls have equal mass and radius (called R). We model only two ball collisions, and assume that there is no friction.

Impulses, denoted I, are assumed to be vectors. Velocities, positions are assume to be pairs with an x-component and a y-component.

The structure of the program is that each ball, each kind of collision, and the check for pocketing for each ball are modeled by programs. A ball is basically a record with fields for name, position and velocity.

The agent ball maintains a given ball (Ball) with initial position (InitPos) and velocity (InitVel). The program is given here in a syntax that allows the declaration of procedures. The syntax $p(X_1, \ldots, X_n)::A$ is read as asserting that for all $X_1, \ldots, X_n p(X_1, \ldots, X_n)$ is equivalent to A. As the game evolves, position changes according to velocity (dot (Ball.pos)=Ball.InitVel) and velocity changes according to the effect of collisions. A propositional constraint Change (Ball), shared between the collision and ball agents, communicates occurrences of changes in the velocity of the ball named Ball. The ball process is terminated when the ball is removed, e.g. it falls in a pocket—as before, the higher priority of do . . . watching pocketed(Ball) relative to do ( . . . ) watching Change(Ball) is captured by lexical nesting.

```
ball(Ball, InitPos, InitVel)::
   do (Ball.pos = InitPos,
   do hence Ball.vel = InitVel watching Change(Ball),
   whenever Change(Ball) do ball(Ball, Ball.pos, Ball.newvel)
   hence dot(Ball.pos) = Ball.vel)
watching pocketed(Ball).
```

The table is assumed to start at (0,0), with length xMax and breadth yMax. If a ball hits the edge, one velocity component is reversed in sign and the other component is unchanged.

```
edge_collision(B)::
   always (if (B.pos.xl = B.r) or (B.pos.x = xMax -- B.r)
      then (Change(B), B.newvel = (-- B.vel.x, B.vel.y)),
   if (B.pos.y = B.r) or (B.pos.y = yMax -- B.R.)
      then (Change(B), B.newvel = (B.vel.x, -- B.vel.y))).
```

Ball-ball collisions involve solutions to the quadratic conservation of energy equation. "if $|I|=0$ else $|I|>0$" chooses the correct solution, $I \neq 0$. The solution $I=0$ makes the balls go through each other! We use distance(P1,P2) as short hand for the computation of the distance between the P1 and P2.

```
two_ball_collision(B1,B2)::
   always if (B1 · pos = P1,B2 · pos = P2,B1 · vel = V1,B2 · vel = V2
   distance(P1,P2) = 2*R)
   then
   (I_{B1,B2} · y*(P2 · x - P1 · x) = (P2 · y - P1 · y)*I_{B1,B2} · X,
   M*|V1|^2 + M*|V2|^2 = M*|B1 · newvel| 2 + M*|B2 · newvel|^2,
   M*V1 + I_{B1,B2} - M*B1 · newvel,M*V2 - I_{B1,B2} = M*B2 · newvel,
   if |I_{B1,B2}| = 0 else |I_{B1,B2}| > 0,
   change(B1, change(B2)).
```

A ball is pocketed if its center is within distance p from some pocket.

pocket(Ball)::always if in-pocket(xMax, yMax, Ball.pos) then pocketed(Ball).

in-pocket(xMax, yMax, P)::(distance(P, (0, 0))<p or distance(P, (o, yMax))<p or distance(P, (xMax, 0))<p or distance(P, (xMax, yMax))<p or distance(P, (xMax/2, 0))<p or distance(P, (xMax/2, yMax))<p).

4.5 The Copier Paper Path

We now present a larger example, which utilizes some of the programming ideas illustrated by the previous "toy" examples. We model the copier paper path that we mentioned in Section 1. As we discussed there, we will model each of the components of the paper path in Hybrid cc, and put them to produce a model for the entire paper path. This model and the underlying intuitions are discussed in detail in Vineet Gupta, Vijay Saraswat, and Peter Struss. A model of photocopier paper path. In Proceedings of the 2nd IJCAI Workshop on Engineering Problems for Qualitative Reasoning, August, 1995—here we present an overview.

The constraint system we use for this model is richer than the constraint system described before—besides simple propositions and first-order formulas on them, we can asset arithmetic inequalities between variables, their derivatives and real constants. We will also allow the expression of attribute-value lists—given a list L we can use L.a to refer to the value of a in the list L, if it exists. L[a=r,b=s, . . . ] adds the attributes a,b, . . . to L with value r,s, . . .

The Intuitions

Our basic idea is to construct models for each of the individual components of the paperpath—the rollers and belts etc. We will also build a model for the sheets of paper going through the paperpath. In addition, we need to model the local interaction between a sheet of paper and a transportation element, i.e. a belt or a roller.

This interaction results in the transportation elements applying forces to the sheet, and the sheet then transmits these forces and moves under their influence. The local interactions will naturally induce a partition of the sheet into segments, which we view as individual entities, analyzing their freebody diagrams.

We make a number of modeling assumptions to simplify our model. For example, we do not model the acceleration of the sheet of paper, instead we view its velocity as changing discretely when a change takes place in the influences on it. We also assume that the sheet is homogeneous, the paperpath is straight, and some other things, these are discussed in detail in Vineet Gupta, Vijay Saraswat, and Peter Struss, a model of photocopier paper path, Proceedings of the 2nd IJCAI Workshop on Engineering Problems for Qualitative Reasoning, August, 1995.

The Model

The paperpath is modeled as a segment of the real line, and each component occupies a segment of the real line. All forces and velocities are oriented with respect to the paperpath. The first model fragment describes a basic transportation element—this can be further specialized into models for different types of belts and rollers. The properties and initial state of the element are specified using an attribute-value list Init. Each element has a nominal velocity $V_{nom}$, which is the velocity along the paperpath supplied by the motor. It also has an actual velocity $V_{act}$, which may be differ from the nominal velocity, as a sheet of paper may be pulling or pushing the element. The force exerted on the transportation element is denoted $F_{act}$, and the force exerted by the motor is denoted $F_{resist}$. The freebody equation relates these two. $F_{resist}$ is bounded by $F_{fast}$ and $F_{slow}$. The remaining constraints show the relation between the forces and the velocities—they assert that if the element is going faster than the nominal velocity $V_{nom}$, then the force $F_{act}$ must be at its maximum value and similarly for the minimum value.

```
transportationElement(T, Init)::always(transport(T),
    T.Loc=Init.Loc, T.surfacetype=Init.surfacetype,
    T.F_fast=Init.F_fast, T.F_slow=Init.F_slow,
    T.F_normal=Init.F_normal,
    T.F_act+T.F_resist=0,
    -T.F_fast ≦ T.F_resist ≦ T.F_slow,
    if T.V_act>T.V_nom then T.F_act=T.F_fast,
    if T.V_act<T.V_nom then T.F_act=-T.F_slow).
```

This model is simply an enumeration of the constraints on the transportation element, these are always true. The value of $V_{nom}$ is not set here, this is done during the specialization of this generic transportation element description into various particular kinds of elements.

The next "component" of the paperpath is the sheet of paper that travels along it. This again has a number of properties, and also an initial location. Furthermore, the sheet is partitioned into various segments—the contactSegments are those portions of the sheet in contact with some transportation element. Between two contact segments is an internalSegment, whereas beyond the extreme contact segments are the TailSegments. In order to create these segments, we use the new operator forall X: C[X].A[X]. This is simply a parallel composition of finitely many A[X]'s, one for each X such that C[X] is true. The declarative style of programming is particularly useful here—this way of asserting the existence of segments is much simpler than the dynamic creation and destruction of segments that would have to be done in an imperative program.

```
sheet(S, Init)::
    S.Loc = Init.Loc,
    do always
        sheet(S),
        S.width = Init.width, S.length = Init.length,
        S.thickness = Init.thickness, S.elasticity = Init.elasticity,
        S.surfacetype = Init.surfacetype, S.strength = Init.strength,
        if ∃I.(S.I.condition-tearing) then S.torn,
        forall T:transport(T). if (T.engaged, |T.Loc∩S.Loc | > 0)
            then contact(S, S.Loc∩T.Loc),
        forall I:contact(S, I). contactSegment(S, I),
        forall I:contact(S, I). forall J:contact(S, J).
        if I < J then if ∃K.(contact(S, K), I < K < J)
            else internalSegment(S, (ub(I), 1b(J))),
        forall I:contact(S, I). if ∃K.(contact(S, K), K < I)
            else leftTailSegment(S, (1b(S.Loc), 1b(I))),
        forall I:contact(S, I). if ∃K.(contact(S, K), I < K)
            else rightTailSegment(S, (ub(I), ub(S.Loc))),
        dot(1b(S.Loc)) = S.vel.1b(S.Loc),
        dot(ub(S.Loc)) = S.vel.ub(S.Loc))
    watching S.torn.
```

For brevity, we omit the code for the segments of the sheet. The agent interact creates an interaction process sheetTransportation for each transportation element overlapping the sheet. The sheet transportation process models the interaction between the sheet and the transportation element. It asserts that the force exerted by the element on the sheet is equal and opposite to the force exerted by the sheet on the element. It gives the freebody equation for the contact segment, and then bounds the amount of force exerted by the transportation element by the amount of friction. Finally, the friction and the velocities are related.

```
interact(S)::
    always forall T:transport(T).
        if(T.engaged, |T.Loc∩S.Loc| > 0)
            then sheetTransportation(S, T, T.Loc∩S.Loc).
        sheetTransportation(S, T, I)::
            new F_friction in
                (I = S.Loc∩T.Loc,
                F_friction = mu(S.surfacetype, T.surfacetype) × T.F_normal,
                S.I.F_te + T.F_act = 0,
                S.(1b(I)).F_left + S.(ub(I)).F_right + S.I.F_te = 0,
                |S.I.F_te | ≦ F_friction,
                if S.vel.(ub(I)) > T.V_act then S.I.F_te = - F_friction,
                if S.vel.(ub(I)) < T.V_act then S.I.F_te = F_friction).
```

Finally we provide the model for the paperpath shown in FIG. 1. The various kinds of transportation elements are modeled first, followed by a typical sheet, then these are composed together to give the entire paperpath. There is one new combinator used here—wait T do A, which waits for T seconds before starting A. This can be expressed in terms of the basic combinators. A new sheet is placed at (0,21) every time a signal Sync is received from the scheduler.

```
cvElement(R, Init)::
    transportationElement(R, Init), always (R, V_nom = Init.V_nom, R.engaged).
roller(R, Init)::
    cvElement(R, Init[surfaceType = rubber, F_fast = 1000, F_slow = 1000,
    F_normal = 300]),
    if (R.F_act = R.F_slow ∨ R.F_act = -- F_fast) then R.broken.
clutchedRoller(R, Init)::
    cvElement(R, Init[surfaceType = rubber, F_fast = 3, F_slow = 1000,
    F_normal = 200]),
    if R.F_act = R.F_slow then R.broken.
belt(R, Init)::
    cvElement(R, Init[surfaceType = steel, F_fast = 10000, F_slow = 10000,
    F_normal = 120]).
fuserRoll(R, Init)::
    cvElement(R, Init[surfaceType = rubber, F_fast = 1000, F_slow = 1000,
    F_normal = 1000]).
regClutch(R, Init)::
    transportationElement(R, Init), always R.engaged,
    always (if R.on then do always R.V_nom = Init. V_nom watching R.off,
    if R. off then do always R.V_nom = 0 watching R.on).
a4GlossySheet(S)::
    sheet(S, [length = 21, width = 29.7, thickness = 0.015, elasticity = 15,
    surfaceType = glossy, strength = 500, Loc = (0, 21)]).
copierModel(Sync) :: new (R1, R2, R3, R4, R5, R6) in
    (roller(R1, (V_nom = 30, Loc = (10, 10.5)]),
    roller(R2, [V_nom = 30, Loc = (30, 30.2)]),
    regclutch(R3, [Vnom = 30, Loc = (39.9, 40.1), surfaceType = rubber,
        F_fast = 1000, F_normal = 1000, F_normal = 300]),
    clutchedRoller(R4, [V_nom = 0, Loc = (50, 50.1)]),
    belt(R5, [V_nom = 30, Loc = (55, 80)]),
    fuserRoll(R6, [V_nom = 35, Loc = (85, 86)]),
    always (f(rubber, glossy) = 0.8, f(steel, glossy) = 0.1),
    always if Sync then (new S in (a4GlossySheet(S), interact(S)),
    R3.off, wait .8 do R3.on)).
```

The model can now be executed to simulate the photocopier. However, we would like to put to the various other uses mentioned in the introduction, by exploiting the fact that Hybrid tcc has a well-defined mathematical semantics.

One simple use for our model would be to verify whether some properties are true of it. For example we might want to assert that sheets will never tear—always forall S:sheet (S). if S.torn then ERROR. Similarly, several other properties can be asserted, these can be now proved using various theorem-proving and model-checking techniques. We could also want to prove that successive sheets never overlap—this proof would give us a condition on how far apart the Sync signals must be. Similar techniques may be used for control code generation. The other applications mentioned in the introduction also make use of such formal models and their semantics.

4.6 Qualitative simulation

Abstract interpretation of Hybrid tcc programs might provide an alternate conceptual framework for the qualitative modeling approaches.

Hybrid tcc can be used to model exactly systems with continuous and discrete change. For example, here is a model of a bathtub, with the tap on, and the drain unplugged.

```
bathtub(Inflow, F, Capacity) :: new (netflow, outflow, amount) in
    constant(F), monotone(F), F(0) = 0,
    constant(Inflow),
    constant(Capacity),
    do always (netflow = outflow + Inflow,
        outflow = F(amount),
        dot(amount) = netflow)
    watching (amount = Capacity ∧ dot(amount) > 0).
```

Here the first three lines assert that the three parameters do not vary with time, and that F is a monotone function in its argument, assuming the value 0 on input 0.

Essentially with this information, QSIM produces a graph that shows that from the initial state there are only three possible (qualitative) states that the program can transit to (for any possible input values of Inflow, F, and Capacity): namely those in which the tub overflows, the tub equilibrates at a level below Capacity, and the tub equilibrates at capacity. To do this reasoning, QSIM employs knowledge about the behavior of continuously-varying functions.

Since Hybrid tcc provides an exact description of the model, it should be possible to do an abstract interpretation of the program to get the qualitative reasoning of QSIM. This is useful in cases when a precise value for the inputs is not known, only a range is given. Abstract interpretation could also be useful in verification. For example, in the cat-and-mouse example, we may not know the exact velocities of the cat and the mouse, only a range of velocities. However it may still be possible to prove that the mouse always wins. The ability to run this program abstractly for all the possible values of the velocities provides an alternative way of verification of this property.

5 Future work

This paper presents a simple programming language for hybrid computing, extending the untimed computation model of Default cc uniformly over the reals. Conceptually, computation is performed at each real time point; however, the language is such that it can be compiled into finite automata. We have an interpreter for the language by directly extending the interpreter for Default cc, with an integrator for computing evolution of a set of variables subject to constraints involving differentiation.

We demonstrate the expressiveness of the language through several programming examples, and show that the preemption-based control constructs of the (integer-time based) synchronous programming languages (such as "do . . . watching . . . ) extend smoothly to the hybrid setting.

Much remains to be done. What are semantic foundations for higher-order hybrid programming, in which programs themselves are representable as data-objects? How should such a hybrid modeling methodology be combined with the program structuring ideas of object-oriented programming? What is the appropriate notion of types in such a setting?

How do the frameworks for static analysis of programs (data- and control-flow analysis, abstract interpretation techniques) generalize to this setting? What are appropriate techniques for partial evaluation and program transformation of such programs? Besides these language issues, there are a number of modeling and implementation issues—What are appropriate continuous constraint systems which have fast algorithms for deciding the entailment relation? Can boundary value problems be solved in this framework? How does stepsize in numerical integration techniques affect execution and visualization of results? Some of these will be the subject of future papers.

Computing with continuous change

1 Introduction and motivation

The construction of the software to implement, monitor, control and diagnose complex systems composed of electro-mechanical and computationally realized elements is a complex task. We are investigating the application of model-based computing techniques to address this complexity. Model-based computing is based on the idea that such machine-related software can be produced by applying appropriate reasoning techniques to a declarative, veridical model of the electro-mechanical system.

The model-based computing approach places a set of requirements on the nature of the modeling language. We motivate these demands by considering a concrete example—the paper path of a simple photocopier, see FIG. 7.

EXAMPLE 1

Paper Transportation in a Photocopier

In the photocopier of FIG. 7, paper is loaded in a paper tray at the left of the machine. When a signal is received, the acquisition roll (Acq Roll) is lowered onto the paper and pulls the top sheet of paper towards the first set of rollers (R1). After the paper is grasped by the first set of rollers, the acquisition roll (Acq Roll) is lifted, and the rollers (R2,R4) pull the paper forward, till it reaches the registration clutch (R3). This starts at a precise moment for perfect alignment, and the image is transferred onto the paper by the image transfer mechanism. The vacuum belt (5) transports it to the fuser roll (R6), from where it exists.

Hybrid modeling

The photocopier of FIG. 7 has a collection of components with continuous behavior, for example, the rollers and belts. The control program of the photocopier is a discrete event driven system. Therefore, the modeling language should be able to describe the interaction of the control program and the continuous components—thus, the modeling language has to fall in the framework of hybrid systems.

Executability

Given a model of the system, it should be possible to predict the behavior of the system when inputs are supplied. Thus the model should be executable, i.e. it should also be possible to view models as programs. This would allow hybrid control programs to be written using the same notation as component models. If sensors and actuators coupling the language implementation with the physical environment are provided then, in fact, it should be possible to use programs in this notation to drive physical mechanisms.

Compositional modeling

Out of considerations of reuse, it seems clear that models of components should reflect their physics, without reflecting any pre-compile knowledge of the structure (configurations) in which they will be used (the "no function in structure principle,"). Concretely, this implies that the modeling language must be expressive enough to modularly describe and support extant control architectures and techniques for compositional design of hybrid systems. From a programming language standpoint, these modularity concerns are addressed by the analysis underlying synchronous programming languages, (adapted to dense discrete domains); this analysis leads to the following demands on the modeling language.

The modeling should support the interconnection of difference components, and allow for the hiding of these interconnections. For example, the model of the copier is the composition of the control program and the model of the paper path. The model of the paper path in turn, is the composition of the models of the roller, clutches, etc.

Furthermore, in the photocopier example, if paper jams, the control program should cause the rollers to stop. However, the model of the rollers, in isolation, does not need to have any knowledge of potential error conditions. Thus, the modeling language should support orthogonal preemption—any signal can cause preemption.

Finally, the language should allow the expression of multiple notions of logical time—for example, in the photocopier the notion of time relevant to the paper tray is (occurrences of) the event of removing paper from the tray; the notion of time relevant to the acquisition roll is determined by the rotation rate of the roller; the notion of time of the image transfer mechanism is the duration of the action of transferring images, etc.

Thus, we demand that the modeling language be an algebra of processes, that includes concurrency, hiding, preemption and multiform time.

Declarative view

It must be possible for systems engineers—people quite different in training and background from software engineers—to use such a formalism. Typically, systems engineers understand the physics of the system being designed or analyzed, and are used to mathematical or constraint-based formalisms (equational and algebraic models, transfer functions, differential equations) for expressing that knowledge. This suggests that it must be possible to view a model (fragment) expressed in the language as a declaration of facts in a (real-time) (temporal) logic.

Reasoning

Given a model of the paper-path, and the control procedures governing it, it should be possible to perform a tolerance analysis—establish the windows on early/late arrival of sheets of papers at various sensors on the paper-path, given that a particular physical component may exhibit any behavior within a specified tolerance. This, and other such engineering tasks, suggest that the modeling language must be amenable to (adapting) the methodology developed in the extensive research on reasoning about hybrid and real-time systems—for example, specification and verification of properties of hybrid systems, qualitative reasoning about physical systems, and envisionment of qualitative states.

1.1 What have we done?

This paper describes and studies a modeling language, Hybrid cc—hybrid concurrent constraint programming. Intuitively, Hybrid cc is obtained by "freely extending" an untimed non-monotonic language default cc over continuous time.

We introduce the notion of a continuous constraint system to describe the continuous evolution of system trajectories.

Hybrid constraint languages—developed generically over continuous constraint systems—are obtained by adding a single temporal construct, called hence. Intuitively, a formula hence A is read as asserting that A holds continuously beyond the current instant.

We describe operational and denotational semantics and show Full Abstraction (for non-Zeno processes). The operational semantics has been implemented to yield an interpreter for Hybrid cc.

We show that continuous variants of preemption-based control constructs and multiform timing constructs are definable in Hybrid cc. In particular, we show that these combinators arise as instances of a uniform preemption construct ("clock").

We adapt the ideas underlying compilation algorithms of synchronous languages to compile Hybrid cc programs to (essentially) hybrid automata. This makes the programs amenable to existing verification techniques.

1.2 The underlying computational intuition

Hybrid cc is a language in the concurrent constraint programming framework, augmented with a notion of continuous time and defaults. The (concurrent) constraint (cc) programming paradigm replaces the traditional notion of a store as a valuation of variables with the notion of a store as a constraint on the possible values of variables. Computation progresses by accumulating constraints in the store, and by checking whether the store entails constraints. Recently, several concrete general-purpose programming language have been implemented in this paradigm.

A salient aspect of the cc computation model is that programs may be thought of as imposing constraints on the evolution of the system. Default cc provides five basic constructs: (tell) P (for P a primitive constraint), parallel composition (A, B), positive ask (if P then A), negative ask (if P else A), and hiding (new X in A). The program P imposes the constraint P. The program (A, B) imposes the constraints of both A and B—logically, this is the conjunction of A and B. new X in A imposes the constraints of A, but hides the variable X from the other programs—logically this can be thought of as a form of existential quantification. The program if P then A imposes the constraints of A provided that the rest of the system imposes the constraints P—logically, this can be thought of as intuitionist implication. The program if P else A imposes the constraints of A unless the rest of the system imposes the constraint P—logically, this can be thought of as a form of defaults [Rei80]. (Note that if P else A is quite distinct from the program if ¬P then A (assuming that the constraint system is closed under negation). The former will reduce to A if the final store does not entail P; the latter will reduce to A if the final store entails ¬P.) The difference arises because, by their very nature, stores can contain partial information; they may not be strong enough to entail either P or ¬P. (In the time contexts discussed below, the subtlety of the non-monotonic behavior of programs—intimately related to the casualty issues in synchronous programming languages—arises from this combinator.) To see this, note that A may itself cause further information to be added to the store at the current time instant; and indeed, several other programs simultaneously be active and adding more information to the store. Therefore requiring that information P be absent amounts to making a demand on "stability" of negative information.

This declarative way of looking at programs is complemented by an operational view. The basic idea in the operational view is that of a network of programs interacting with a shared store of primitive constraints. The program P is viewed as adding P to the store instantaneously. The program (A, B) behaves like the simultaneous execution of both A and B. new X in A starts A but creates a new local variable X, so no information can be communicated on it outside. The program if P then A behaves like A if the current store entails P. The program if P else A behaves like A if the current store on quiescence does not entail P.

The cc paradigm has no conception of time execution. For modeling discrete, reactive systems, Vijay Saraswat et al., Default Times Concurrent Constraint Programming, Proceedings of Twenty Second ACM Symposium on Principles of Programming Languages, San Francisco, January, 1995, introduced the idea (from synchronous programming) that the environment reacts with a system (program) at discrete time ticks. At each time tick, the program executes a cc program, outputs the resulting constraint, and sets up another program for execution at the next clock tick. Concretely, this led to the addition of two control constructs to the language next A (execute A at the next time instant), and always A (execute A at every time instant). Thus, intuitively, the discrete timed language was obtained by uniformly extending the untimed language (Default cc) across (integer) time.

Continuous evolution over time

We follow a similar intuition in developing Hybrid cc: the continuous time language is obtained by uniformly extending Default cc across real (continuous) time. This is accomplished by two technical developments.

First, we enrich the underlying notion of constraint system to make it possible to describe the continuous evolution of state. Intuitively, we allow constraints expressing initial value (integration) problem, e.g. constraints of the form X=0, hence dot(X)=1; from these we can infer at time t that X=t. The technical innovation here is the presentation of a generic notion of continuous constraint systems (ccs), which builds into the very general notion of constraint systems just the extra structure needed to enable the definition of continuous control constructs (without committing to a particular choice of vocabulary for constraints involving continuous time). As a result subsequent development is parametfic on the underlying constraint language: for each choice of a ccs we get a hybrid programming language.

Second we add to the untimed Default cc a single temporal control construct: hence A. Declaratively, hence A imposes the constraints of A at every time instant after the current one. Operationally, if hence A is invoked at time t, a new copy of A is invoked at each instant in (t, oo).

Intuitively, hence might appear to be a very specialized construct, since it requires repetition of the same program at every subsequent time instant. However, hence can combine in very powerful ways with positive and negative ask operations to yield rich patterns of temporal evolution. The key idea is that negative asks allow the instantaneous preemption of a program—hence, a program hence if P else A will in fact not execute A at all those time instants at which P is true.

Let us consider some concrete examples. First, clearly, one can program always A (which executes A at every time instant) by (A, hence A). Second, suppose that we require that a program A be executed at every time point beyond the current one until the first time instant at which P can be expressed as new X in (hence (if X else A, if P then always X)). Intuitively, at every time point beyond the current one, the condition X is checked. Unless it holds, A is executed. X is local—the only way it can be generated is by the other program (if P then always X), which, in fact generates X continuously if it generates it at all. Thus, a copy of A is executed at each time point beyond the current one upto (and excluding) the first time point at which P is detected.

Similarly, to execute A precisely at the first time instant (assuming there is one) at which P holds, execute: new X in hence (if X else if P then A, if P then hence X).

We show that the continuous version of the general preemption control construct clock is definable within the model presented here. The patterns of temporal behavior described above are obtainable as specializations of clock. Further, we show how programs containing the clock combinator may be equationally rewritten into programs not containing the combinator.

While conceptually simple to understand, hence A requires the execution of A at every subsequent real time instant. Such a powerful combinator may seem impossible to implement computationally. For example, it may be possible to express programs of the form new T in (T=0, hence dot(T)=1, hence if rational(T) then A) which require the execution of A at every rational q>0. Such programs are not implementable. We show that in fact Hybrid cc is computationally realizable. The basic intuition we exploit is that, in general, physical systems change slowly, with points of discontinuous change, followed by periods of continuous evolution. Technically, we introduce a stability condition (Condition 5, Section 2.2) for continuous constraint systems that guarantees that for every constraint P and Q there is a neighborhood around 0 in which P either entails of disentails Q at every point. This rules out constraints such as rational (T) as inadmissible.

With this restriction, computation in Hybrid cc may be thought of as progressing in alternating phases of computation at a time point, and in an open interval. Computation at the time point establishes the constraint in effect at that instant, and sets up the program to execute subsequently. Computation in the succeeding open interval determines the length of the interval r and the constraint whose continuous evolution over (0,r) describes the state of the system over (0,r).

Rest of this paper

Formally, we proceed as follows. First, we review our earlier work on constraint systems and Default cc. Next, we describe the denotational model of Hybrid cc as an "extension" of Default cc over continuous time. This extension proceeds in two stages. First, we introduce the notion of a continuous constraint system—a real-time extension of constraint systems—to describe the continuous evolution of system trajectories. Next, we extend the Default cc model of processes over continuous time to describe Hybrid cc processes. This denotational model formalizes the "programs as constraints" idea and associates with each process, the collection of its observations. Next, we describe the operational semantics, an effective presentation of the operational view alluded to earlier. Finally, we establish the connection between the denotational and operational semantics.

The following contains the formal definition of the clock operator, and transformation rules for it, and contain a representative programming example. In addition, several other examples, including a model of the paperpath of the simple photocopier (see "Modeling a paper path," by V. Gupta and P. Struss in the proceedings of Qualitative reasoning, 95) have been programmed in Hybrid cc.

What remains to be done?

A key area of future work is the development of reasoning methodologies for Hybrid cc. The good formal properties of Hybrid cc constitute preliminary evidence for the potential of adapting extant reasoning methodologies to Hybrid cc programs/models. It remains to carry out this program fully. In this endeavor, we hope that the denotational framework underlying Hybrid cc will facilitate the synthesis of three different traditions of static analysis—(1) the tradition of specification/verification; (2) the tradition of abstract interpretation, and (3) the tradition of types and type inference in functional/object-oriented languages. The integration of (2) and (3) in the framework of constraint based program analysis, the implicit integration of (1) and (2), via homomorphisms as abstractions, and the integration of (1) and (3) in the work on interaction categories constitute evidence for the viability of this program.

2. Hybrid concurrent constraint programming 2.1 Default cc programming

We first review Default cc programming.

Constraint systems

A constraint system D is a system of partial information, consisting of a set of primitive constraints (first-order formulas) or tokens D, closed under conjunction and existential quantification, and an inference relation (logical entailment) ⊢ that relates tokens to tokens (For technical convenience, the presentation here is a slight variation on earlier published presentations.) ⊢ naturally induces logical equivalance, written ≈. Formally, Definition 2.1

A constraint system is a structure $<D\vdash,Var,\{\exists_x|X\in Var\}>$ such that:

D is closed under conjunction (∧):⊢⊆D×D satisfies:
- $P\vdash P$; $P\vdash Q$ and $Q\wedge R\vdash T$ implies that $P\wedge R\vdash T$
- $P\wedge Q\vdash P$ and $P\wedge Q\vdash Q$; $P\vdash Q$ and $P\vdash R$ implies that $P\vdash Q\wedge R$ Var is an infinite set of propositional variables, such that for each variable $X\in Var, \exists_x:D\to D$ is an operation satisfying usual laws on existentials: $P\vdash\exists_x P, \exists_x (P\wedge\exists_x Q)\approx\exists_x P\wedge\exists_x Q, \exists_x\exists_Y P\approx\exists_Y\exists_x P$ and $P\vdash Q\Rightarrow\exists_x P\vdash\exists_x Q$.

A constraint is an entailment closed subset of D. For any set of tokens, S, we let $\overline{S}$ stand for the set $\{P\in D|\exists\{P_1,\ldots,P_k\}\subseteq S.P_1\wedge\ldots P_k\vdash P\}$. For any token P, $\overline{P}$ is just the set $\{\overline{P}\}$.

We use a, c, d, e . . . to range over constraints. The set of constraints, written |D|, ordered by inclusion (⊆) form a complete algebraic lattice with least upper bounds induced by ∧. Reverse inclusion is written ⊇. ∃,⊢ lift to operations on constraints. An example of a constraint system is Herbrand, underlying logic programming—tokens are equalities over terms which are finite trees with variables ranging over trees. In the rest of this subsection we will assume that we are working in some constraint system $<D,\vdash,Var,\{\exists_x|X\in Var\}>$. We will let P, Q, R, T , . . . range over D.

Computability: We demand decidability of ⊢ to make the operational semantics effective.

Denotational semantics

Observe for each program A those stores d in which they are quiescent, given the guess e about the final result. Note that the guess e must always be stronger than d—it must contain at least the information on which A is being tested for quiescence.

Definition 2.2 (Simple Observations) SObs=$\{(d, e)\in |D|\times |D| | e\supseteq d\}$. □

To describe processes and the denotation of combinators, we need some notation—for a set S of constraints, and constraint e,(S,e) stands for the set $\{(d,e)|d\in S\}$; ⊓S stands for the greatest lower bound of S and P≦S exactly when each element in S entails P. Given a collection of sets $(S_i,e_i)$ we write $\cup(S_i,e_i)$ for their union. If X is a propositional variable, $\exists_x S=\{(c\wedge X|c\in S\}\cup\{\exists_x c|c\in S\}$.

A process is a collection of observations that satisfy two "closure" conditions: 1) Local determinacy—the idea is that once a guess is made, every process behaves like a determinate and monotone (with respect to the partial order on constraints) program; 2) Guess convergence—we will only make those guesses under which a process can actually quiesce.

Definition 2.3 (Process)

A process Z is a subset of SObs satisfying: (1)($\sqcap$S,e)∈Z if S≠∅ and (S,e)⊆Z and (2) (e,e)∈Z if (d,c)∈Z.

The denotational semantics of the combinators can now be described.

$\mathcal{P}[abort]d)\emptyset$ $\mathcal{P}[A,B]d\underline{=}\mathcal{P}[A]\cap\mathcal{P}[B]$ $\mathcal{P}[P]d\underline{=}\{(d,e)\in SObs|P\in d\}$ $\mathcal{P}[if\ P\ then\ A]d\underline{=}\{(d,e)\in SObs|P\in e\to(e,e\in\mathcal{P}[A], P\in d\to (d,e)\in\mathcal{P}[A]\}$ $\mathcal{P}[if\ P\ else\ A]d\underline{=}\{(d,e)\in SObs|Pe\to (d,e)\in\mathcal{P}[A]$ $\mathcal{P}[new\ X\ in\ A]d\underline{=}new_x\mathcal{P}[A]$ where for a process Z $new_x Z\ d\cup\{(\exists_x S,e)\subseteq SObs|(S,\exists_x e)\subseteq Z\ or\ (S,(\exists_x e)\cup\{X\})\underline{=}\subseteq Z, X\leqq S\}$ The two cases in the definition of $new_X Z$ correspond intuitively to the following two possibilities: 1) Z quiesces on $\exists_x e$. This case corresponds to the situation in which the execution of Z does not produce an internal X; 2) Z quiesces on e. In this case, Z must itself produce the X, since there is no other program around to produce it.

Operational semantics

A configuration is a multiset of programs—to be thought of as the parallel composition of the programs. We define binary transition relations→p on configurations; thus, the transition relation is indexed by the "guessed output token" P that will e used to evaluate defaults. σ(θ) is the conjunction of the tokens in θ.

$$\frac{\sigma(\Gamma)\vdash Q}{\Gamma,\text{if }Q\text{ then }B\to p\Gamma,B}\qquad\frac{P\forall Q}{\Gamma,\text{if }Q\text{ else }B\to p\Gamma,B}$$

$$\Gamma,\text{ new }X\text{ in }A\to p\Gamma,A[Y/X],\ Y\in\!/PA,\Gamma\in\Gamma,(A,B)\to p\Gamma,A,B$$

Execution of a program A corresponds to finding a terminal configuration θsuch that the "guessed output constraint" is actually achieved.

$$\frac{\Gamma\to^*p\Gamma'\to/p\ \exists_Y[\sigma(\Gamma')]=P}{\Gamma\to\Gamma'}$$

where $\overline{Y}$ are the (propositional) variables in $\Gamma'$ that are not in e; these are the variables introduced for new local variables by the operational semantics.

2.2 Continuous constraint systems

Continuous constraint systems augment constraint systems with the notion of a constraint holding continuously over a period of time. This is done via two mechanisms: for every token P, we have a token hence P. Intuitively, such a token is an activity condition that says that P is in effect at every instant r>0. In addition, we require to be given, for every r∈R, a relation $\vdash_r\subseteq D\times D$. The relation describes what tokens (the r-projection) must follow at time r given some initial and activity conditions. Intuitively such a family of relations captures the information content of "initial value problems" in integration. Formally, we have the following conditions:

| | |
|---|---|
| hence P ⊢ hence hence P, | hence hence P ⊢ hence P (1) |
| P ⊢ Q → hence P ⊢ hence Q | hence P ⊢$_r$ P, if r > 0 |

A token is instantaneous if it not an activity condition, i.e., for no Q, P⊆⊢ hence Q. We use IP, IQ, etc. to range over instantaneous tokens.

It is not necessarily the case that P⊢, P, unless of course r=0.

$$P⊢_0 P \quad (2)$$

Transitivity must be preserved on the left and the right, with respect to ⊢:

$$\frac{Q'⊢Q\; Q \wedge R⊢_r S\; S⊢S'}{Q' \wedge R⊢_r S'} \quad (3)$$

The duration of integration is important, not when it was started.

$$\frac{IP \wedge \text{hence } Q⊢_r R\; R \wedge \text{hence}\sim Q⊢_s S}{IP \wedge \text{hecne} Q⊢_{r+s} S} \quad (4)$$

Finally, we demand a neighborhood of 0, where ⊢$_r$ information is "stable." Define P⊢$^r$Q(P(∀)$^r$Q) exactly if P$_t$⊢$_t$Q(P(∀)$_t$Q) for all t∈(0,r). Then we require:

$$(\forall P,Q \in D)(\exists r>0)[(P⊢^r Q) \wedge (P(\forall)^r Q)] \quad (5)$$

Definition 2.4 (Continuous Constraint System)

A continuous constraint systems (ccs) is a tuple <D,⊢,Var, {∃$_x$|X∈Var},{⊢$_r$|r∈R}> satisfying <D,⊢,Var{∃$_x$|X∈Var}> is a constraint system whose tokens are closed under hence ⊢,⊢$_r$,⊢$^r$,(∀)$^r$ satisfy Eqns 1–5□

A constraint, written a, c, d, e ..., is a ⊢ closed subset of D. This set of all constraints, |D|, ordered by inclusion, ⊆, form a complete algebraic lattice, with least element true. ∃, hence and the entailment relations lift to operations on constraints. Reverse inclusion is written ⊇. Integration operators ∫$^r$, for every r∈R are generated by ⊢$_r$:

$$\int^r c = \{P \in D | \exists Q \in c.Q⊢_r P\}$$

Computability

The following are required to make the operational semantics effective.

1. ⊢,⊢$_r$, (∀)$^r$ are decidable.
2. For all tokens P and for all real numbers r, there exists a token Q$_r$ such that {S|P⊢$_r$S}={S|Q⊢$_0$S}. This ensures that if c is finite in |D|then ∫$^r$c is finite in |D|.

EXAMPLE 2.1

The trivial ccs is defined as follows. Basic tokens are formulas hence d or d, where d is of the form dot(X, m)=r, for X a variable, m a non-negative integer and r a real number. Tokens consist of basic tokens closed under conjunction and existential quantification. The inference relations are defined in the obvious way under the interpretation that dot(X, m)=r states that the mth derivative of X is r, and that hence dot(X, m=r states that for all time t>0 the mth derivative of X is r. The inference relations are trivially decidable: the functions of time expressible are exactly the polynomials. The ⊢$_r$, (∀)$_r$⊢$^r$,(∀)$^r$ relations are expressible parameterically in r; the only non-trivial computation involved is that of finding the smallest non-negative root of univariate polynomials (this can be done using numerical integration).

2.3 Denotational Model of Hybrid cc

In the rest of this section we will assume that we are working in some continuous constraint system <D,⊢,Var, {∃$_x$|X∈Var},{⊢$_r$|r∈R}>.

Notation

We use standard notation for intervals of real numbers: (t1,t2) for the open interval, (t1, t2) for the left closed and right open interval etc. We will be working with partial functions on the reals—their domains will be initial segments of the real line of the form {0,t,t∈R. We use dom(ƒ) for the domain of definition of ƒ. Given ƒ with dom(ƒ)=[0,r) and g with dom(g)=[0,s),h=ƒ·g is defined as h(t)=ƒ(t),t∈[0,r) and h(r+t)=g(t),t∈[0,s). We use ƒ↑[0,t) to denote the restriction of the partial function ƒ to the interval [0,t). Similarly, for ƒ↑[0,t). Given two partial functions ƒ,g, we say ƒ is a prefix of g if graph(ƒ)⊆ graph(g), where graph(ƒ) is the representation of ƒ as a set of pairs (I,ƒ(I)). ƒ is a proper prefix of g if ƒ is a prefix of g and ƒ≠g. If ƒ is a prefix of g, we define the function g after ƒ as: (g afterƒ)(t)=g(t+r) where dom(ƒ)=[0,r) or dom(ƒ)=[0,r]. This is extended to sets of partial functions S in a natural way: S after ƒ={g after ƒ|(∃g ⊇ƒ∈S)}. We also define S(0)={g(0)|g∈S}.

Observations

An observation, a run of the system, is a tracing of the system trajectory over time—pieces of continuous evolution connected by discrete changes.

Definition 2.5 (Observations)

Obs consists of functions ƒ:R→SObs such that dom(ƒ)= [0,r), for some r and satisfying piecewise continuity.

$$(\forall t \in \text{dom}(f))(\exists \epsilon_t)(\exists e_1', e_2' \in D)[(\forall t' \in (t, t+\epsilon_t))f(t')=(f^{t-t}e_1', f^{t-t}e_2')]\square$$

Let ƒ∈Obs,t ∈dom(ƒ). Then, the Default cc observation executed continuously in some right neighborhood of t in ƒ is ƒ(t$^+$)=(p(e$_1$),p(e$_2$)), where p(e)={c|hence c∈e}. The maximal such right neighborhoods are called phases. The notation is extended to subsets S of Obs: S(0$^+$)={ƒ(0$^+$)|ƒ∈S}.

Processes

A process is a collection of observations that satisfies (1) captures the limit closure property of computational systems—if every approximation to an observation ƒ is a system run, so is ƒ(2) instantaneous execution at any time instant is modeled by a Default cc process and (3) the continuous behavior is generated by Default cc processes.

Definition 2.6

A process P is a non-empty, prefix-closed subset of Obs satisfying: 1. If all proper prefixes of ƒ∈Obs are in P, then ƒ∈P. 2. (∀ƒ∈P) (P after ƒ)(0) is a Default cc process. 3. (∀ƒ∈P) (∀t∈dom(ƒ))[(P after ƒ↑[0,t])(0$^+$)] is a Default cc process□

Combinators

P,if P then A, if P else A,(A,B) are inherited from Default cc and their denotations are induced by their Default cc definitions.

$$\mathcal{H}[\![P]\!]d\{f\in\text{Obs}|f(0)=(d,e)\to P\in d\}$$

$$\mathcal{H}[\![\text{if P then A}]\!]d\{f\in\text{Obs}|f(0)=(d,e),P\in d\to f\in\mathcal{H}[\![A]\!],$$

$$P\in e\to g\in\mathcal{H}[\![A]\!] \text{where } g(0)=(e,e),\forall t>0.g(t)=f(t)\}$$

$$\mathcal{H}[\![\text{if P else A}]\!]d\{f\in\text{Obs}\|f(0)=(d,e),P\notin e\to f\in\mathcal{H}[\![A]\!]\}$$

$$\mathcal{H}[\![A,B]\!]d\;\mathcal{H}[\![A]\!]\cap\mathcal{H}[\![B]\!]$$

new X in A imposes the constraints of A, but hides the variable X from the other programs. Every observation ƒ∈ℋ[new X in A] is induced by an observation g∈ℋ[A], i.e. at every time instant t, ƒ(t) must equal the result of hiding X in the Default cc process given by A at time t after history g↑[0,t). Formally, ℋ[new X in A]d $\{f \in \text{Obs} | \exists g \subset \mathcal{H}[\![A]\!].\text{dom}(g)=\text{dom}(f) \wedge (\forall t \in \text{dom}(f))[f(t) \in \text{new}_X(\mathcal{H}[\![A]\!] \text{ after } (g\uparrow[0,t)(0)))]\}$ $\mathcal{H}[\![\text{abort}]\!]\underline{\underline{d}}\{\in\}$ $\mathcal{H}[\![\text{hence } A]\!]\underline{\underline{d}}\{f \in \text{Obs}|(\forall t \in \text{dom}(f))[f \text{ after } (f\uparrow[0,t)) \in \mathcal{H}[\![A]\!]]\}$

2.4 Operational Semantics

We assume that the program is operating in isolation—interaction with the environment can be coded as an observation and run in parallel with the program. We use $\Gamma, \Delta, \ldots$ for multisets of programs; $\sigma(\Gamma)$ is defined as before.

Configurations can be point or interval configurations. A point configuration is a Default cc program that is executed instantaneously (at a real time instant)—all discrete changes happen at point states. This execution results in two pieces of information: the constraint c on quiescence, and the "continuation"—the program to be executed at subsequent times.

Interval configurations are triples $(P,\Gamma,\Delta)$ and model continuous execution. P is the initial token, this is similar to the initial conditions in a differential equation. $\Gamma$ consists of the programs active in the interval configuration. Computation progresses only through the (continuous) evolution of the store as captured by the passage of time. In particular, the interval state is exited as soon as the status of any of the conditionals changes—one which always fired does not fire anymore, or one starts firing. $\Delta$ accumulates the "continuation."

First, we describe transitions from point to interval configurations. $\rightarrow$ is the transition relation of Default cc, and $\delta(\Gamma)$ is the sub-multiset of programs of the form hence A in $\delta$.

$$\frac{\Gamma \rightarrow \Gamma'}{\Gamma \stackrel{hcc}{\rightarrow} (\wedge \sigma(\Gamma), \delta(\Gamma'), \phi)} \quad (6)$$

In the interval configuration $(P,\Gamma, \Delta)$ we are going to execute the program $\delta$ "once," and make sure that the status of the conditionals remains constant throughout the interval $[0,r)$. Condition 5 on continuous constraint systems ensures the existence of such an $r>0$. The derivation relation is indexed by the "guessed output constraint" Q (used to evaluate defaults as in the operational semantics of Default cc) and the length of the interval r.

$$\frac{P,\text{hence}\sigma(\Gamma)\vdash^r R}{(P,(\Gamma,\text{if } R \text{ then } B),\Delta) \stackrel{hcc}{\rightarrow}_{Q,r} (P,(\Gamma,B),\Delta)} \quad \frac{Q(\forall)^r R}{(P,(\Gamma,\text{if } R \text{ else } B),\Delta) \stackrel{hcc}{\rightarrow}_{Q,r} (P,(\Gamma,B),\Delta)}$$

$$P,(\Gamma^*,\text{hence } A),\Delta) \stackrel{hcc}{\rightarrow} {}_{Q,r}(P,(\Gamma,A)(\Delta,A,\text{hence}A)) \quad (P,(\Gamma,A,B)),\Delta) \stackrel{hss}{\rightarrow} {}_{Q,r}(P,(\Gamma,A,B),\Delta)$$

$$(P,(\Gamma,\text{new } X \text{ in } A),\Delta) \stackrel{hcc}{\rightarrow} {}_{Q,r}(P,(\Gamma,A[Y/X]),\Delta)(Y/c,e,A,\Delta,\Gamma)$$

The transition from interval to point configurations, $\stackrel{hcc}{\rightarrow},$ is defined from $\stackrel{hcc}{\rightarrow}$ e,r—verify that the guessed output constraint is achieved and verify that the residual conditionals were not enabled at any intermediate time.

$$\frac{(P,\Delta) \stackrel{hcc}{\rightarrow} {}_{Q,r}(P,\Gamma',\delta)Q = P \wedge \text{hence } \exists^Y - [\wedge \sigma(\Gamma')]\Gamma' \downarrow Qr}{(P,\Gamma,\Delta) \stackrel{hcc}{\rightarrow} (\check{r}Q,\Delta')}$$

where $\check{Y}$ are the (propositional) variables in $\Gamma'$ that are not in Q, the variables introduced for new local variables by the operational semantics. $\Gamma' \downarrow_r^Q$ verifies that the remaining conditionals in $\Gamma'$ were not enabled at any time during the open interval $(0,r)$.

$$P \downarrow_r^Q, \frac{r \downarrow_r^Q A \downarrow_r^Q}{(\Gamma,A) \downarrow_r^Q}, \frac{Q(\vdash)^r P}{\text{if } P \text{ then } A)} \downarrow_r^Q, \frac{Q \vdash^r P}{(\text{if } P \text{ else } A)} \downarrow_r^Q$$

Implementation

The above operational semantics has been used as the basis of an implementation of Hybrid cc on top of the trivial constraint system of Section 2.1. The basic workhorse is the interpreter for Default cc, modified to work with the new constraint system. The guessing of the quiescent point in each phase (instant or interval) is accomplished by local backtracking in each phase. Roots of univariate polynomials are found in order to obtain bounds on the extent of an interval phase. The implementation is in (Sicstus) Prolog, and is available from the authors.

Full Abstraction

The operational and denotational semantics are equivalent. The proofs follow Default tcc and are omitted here for space reasons. Let U and Z be programs.

Theorem 2.1 (Adequacy)

$\mathcal{H}[\![U]\!] = \mathcal{H}[\![Z]\!]$ implies U and Z have the same operational input-output behavior.

The converse of the above theorem does not hold in general because of Zeno processes. For example, the above operational semantics run on a Hybrid cc program of a typical Zeno system—say, a bouncing ball, with a coefficient of restitution $e<1$—does not progress to and beyond the finite real limit point. However, the denotational semantics can potentially have further information.

Theorem 2.2 (Full Abstraction)

For non-Zeno U,Z $\mathcal{H}[\![U]\!] = \mathcal{H}[\![Z]\!]$ if U and Z have the same operational input-output behavior.

2.5 Compilation to constraint hybrid automata

Hybrid cc can be compiled into constraint hybrid automata, a variant of hybrid automata. A constraint hybrid automaton is a directed bipartite graph. The nodes are labeled by Default cc programs—these Default cc programs can be compiled to a finite lookup table. The two kinds of nodes are point and interval states. The start node is a point state. Transitions are labeled by constraints and connect point (resp. interval) to interval (resp. point) states.

Execution is instantaneous in point states—the Default cc program in a point state is executed in parallel with any input from the environment. The automation makes a transition to an interval state based upon the output. Execution in the interval state begins in the succeeding open interval, with the output of the preceding point state treated as the initial condition. In the interval state, the labeling Default cc program is executed continuously in parallel with (continuous) input from the environment, until one of the transitions is enabled. When a transition is enabled, the automaton makes a transition to the corresponding point state. The constraint labeling the transition is treated as environment input to the point state.

Figure 8F:
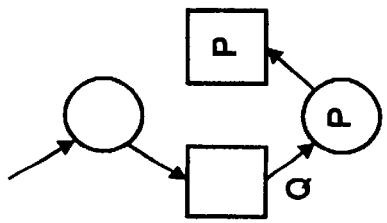
FIGS. 8a–8f sets forth examples of compilation in the Hybrid cc language, such a construction of automation for "hence if Q then P".
Figure 8E:
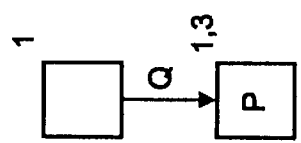
Figure 8D:
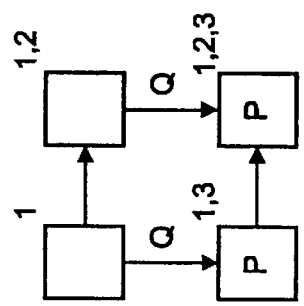
Figure 8C:
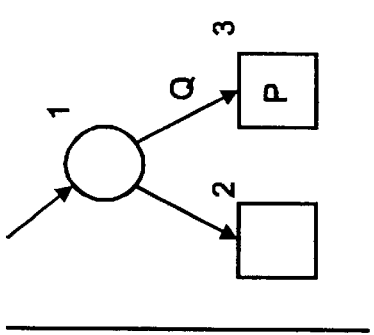
Figure 8B:
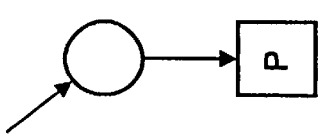
Figure 8A:
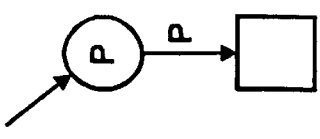

We sketch the construction for hence in FIGS. 8a–8f—the other cases are straightforward, and omitted for space reasons; e.g. the automaton for A,B is (essentially) the product construction. Particularly, FIG. 8a shows automation for P; FIG. 8b illustrates Automation for hence P; FIG. 8c discloses automation for if Q then hence P; FIG. 8d is a construct of powerset automation. FIG. 8e shows minimizing by merging equal states, noting that each state has an implicit arrow to itself. Lastly, FIG. 8f shows splitting each state into a point state and an interval state. Thereafter, a new start state is added and minimizing again takes place.

Automaton for hence A

This is essentially a powerset of the automaton for A. Consider the subsets of the set of states of the automaton for A containing the start state of A. The program at each state is the parallel composition of the programs of the component states. The transition table is induced by this view. Make two copies of this structure, a copy each for the interval states and the point states. The targets of the transitions are relabeled to reach the appropriate point or interval state. Add a transition labeled true from each point state to its corresponding interval state. Finally, add a new start state labeled true, with a single transition labeled true to the interval state labeled by singleton set containing the start state of A.

The determinacy algorithm is used to check that the Default cc program in each state is determinate.

A The Clock construct

Clock clock B do A is a process that executes A only on those instants which are quiescent points of B. Note the resemblance to the when(undersampling) construct of LUSTRE and SIGNAL, and the integrator variables of integrator computation tree logic (ICTL). We show that many common combinators are definable from clock.

Let B be a process. We identify the maximal subsequence $f_B$ of the an observation $f$ that is an element of the process B—a definition by (transfinite) induction. Limit closure of processes (condition (1)) facilitates the induction at limit ordinals. Other inductive steps are:

$$\epsilon B = \epsilon$$
$$(f \cdot g)B = f_B \cdot g \cdot \text{if } g \in (B \text{ after } f_B), g \text{ has only one phase after } 0.$$
$$= f_B \text{ otherwise}$$

Recognizing that A is executed only at the quiescent points of B:

$$\text{clock B do A} = \{f \in \text{Obs} | f \mathcal{H} [\![B]\!] \in \mathcal{H} [\![A]\!]\}$$

However, clock B do a may not be a process for arbitrary $\mathcal{H}[\![B]\!]$. So, we restrict the processes B to be generated by the grammar:

B::=a|if a then abort|if a then hence B|if a else hence B|B,B|hence B

For such processes B, clock B do A is indeed a process. The equational laws that hold for the clock combinator are summarized in table A, in the appendix. These rules allow the elimination of occurrences of clock from any program.

First. first c do A=clock c do A, reduces to A at the first time instant that c becomes true—if there is a well-defined notion of the first occurrence of c, eg. there is no "first" occurrence of c in observations of $\mathcal{H}[\![\text{hence c}]\!]$. In such cases, A will not be invoked.

In the following discussion on definable combinators, we shall not repeat the caveat about the subtlety of the well-definedness of the "first" occurrences of events.

Multiform time. time A on a=clock (always a) do A denotes a process whose notion of time is the occurrence of a—A evolves only when the store entails a.

Watchdogs. do a watching a=clock (first a do abort) do A, read logically as "A until first a," is the strong abortion interrupt of ESTEREL. do A watching a behaves like A until the first time instant when a is entailed; when a is entailed A is killed instantaneously.

Suspension-Activation. This is similar to the familiar (control—Z,fg). $S_a A_b(A)$ behaves like A until the first instant when a is entailed; when a is entailed A is suspended from then on (thus, the $S_a$). A is reactivated in the first time instant when b is entailed (thus, the $A_b$).

| | | |
|---|---|---|
| $S_a A_b(A)$ | = | new X in [do(always X) watching a, first a do (first e do always X), time A on X] |
| hence $(A_1, A_2)$ | = | hence $A_1$, hence $A_2$ |
| clock $(B_1, B_2)$ do A | = | clock $B_1$ do clock $B_2$ do A |
| clock B do $(A_1, A_2)$ | = | clock B do $A_1$, clock B do $A_2$ |
| clock a do A | = | new X in (always [if X else if c then A, if c then hence X]). |
| clock (if a then hence B) do A | = | if a then clock hence B do A, if a else A. |
| clock (if a else hence B) do A | = | if a else clock hence B do A, if a then A. |
| clock if a then abort do A | = | if a else A |
| clock hence B do a | = | a. |
| clock hence B do abort | = | abort. |
| clock hence B do if a then A | = | if a then clock hence B do A |
| clock hence B do if a else A | = | if a else clock hence B do A |
| clock hence a do hence A | = | hence clock hence a do A. |
| clock hence (if a then abort) do hence A | = | hence clock hence (if a then abort) do A |
| clock hence (if a then hence B) do hence A | = | new X in [if a then always X, hence clock hence (if X then hence B) do A] |

-continued $S_aA_b(A)$ = new X in [do(always X) watching a, first a do (first e do always X), time A on X]

clock hence (if a else hence  = new X in [if a else always X, hence clock hence (if X
           B) do hence A           else hence B) do A]

B An extended programming example: Billiards

We model a billiards (pool) table with several balls. The balls roll in a straight line till a collision with another ball or an edge occurs. When a collision occurs the velocity of the balls involved changes discretely. When a ball falls into a pocket, it disappears from the game. For simplicity, we assume that all balls have equal mass and radius (called R). We model only two ball collisions, and assume that there is no friction.

Impulses, denoted I, are assumed to be vectors. Velocities, positions are assumed to be pairs with an x-component and a y-component.

The structure of the program is that each ball, each kind of collision, and the check for pocketing for each ball are modeled by programs. A ball is basically a record with fields for name, position and velocity.

The program ball maintains a given ball (Ball) with initial position (InitPos) and velocity (InitVel). The program is given here in a syntax that allows the declaration of procedures. The syntax $p(X_1, \ldots, X_2)$::A is read as asserting that for all $X_1, \ldots, X_2$) is equivalent to A. As the game evolves, position changes according to velocity (dot(Ball.pos)= Bell.InitVel) and velocity changes according to the effect of collisions. A propositional constraint Change (Ball), shared between the collision and ball programs, communicates occurrences of changes in the velocity of the ball named Ball. The combination do ( . . . ) watching pocketed (Ball) relative to do ( . . . ) watching Change (Ball) is captured by lexical nesting.

ball(Ball, InitPos, InitVel)::do (Ball.pos=InitPos,
      do Hence Ball.vel=InitVel watching Change(Ball),
      first Change(Ball) do ball(Ball, Ball.pos, Ball.newvel)
      hence dot(Ball.pos)=Ball.vel) watching pocketed
      (Ball).

This table is assumed to start at (0,0) with length xMax and breadth yMax. If a ball hits the edge, one velocity component is reversed in sign and the other component is unchanged.

edge.collision(B):: always (if(B.pos.x=B.r) or (B.pos.x= xMax-B.r)
      then (Change(B), B.newvel=(-B.vel.x, B.vel.y)),
      if (B.pos.y=B.r) or (B.pos.y=yMax-B.r)
      then (Change(B), B.newvel=(B.vel.x, -B.vel.y))).

Ball-ball collisions involve solutions to the quadratic conservation of energy equation. "if $|I|=0$ else$|I|>o$" chooses the correct solution, $I \ne 0$. The solution I=0 makes the balls go through each other !!! We use distance (P1,P2) as short hand for the computation of the distance between the P1 and P2.

two_ball_collision($B1,B2$)::
always if ($B1 \cdot$ pos $= P1,B2 \cdot$ pos $= P2,B1 \cdot$ vel $= V1,B2 \cdot$ vel $= V2$
distance($P1,P2$) = $2*R$)
then
$(I_{B1,B2} \cdot y*(P2 \cdot x - P1 \cdot x) = (P2 \cdot y - P1 \cdot y)*I_{B1,B2} \cdot X,$
$M*|V1|^2 + M*|V2|^2 = M*|B1 \cdot$ newvel$| 2 + M*|B2 \cdot$ newvel$|^2,$
$M*V1 + I_{B1,B2} - M*B1 \cdot$ newvel$,M*V2 - I_{B1,B2} = M*B2 \cdot$ newvel,
if $|I_{B1,B2}| = 0$ else $|I_{B1,B2}| > 0$,
change($B1$, change($B2$)).

A ball is pocketed if its center is within distance p from some pocket.

pocket(Ball)::always if in pocket (xMax, yMax, Ball.pos)
      then pocketed (Ball). in pocket (xMax, yMax, P)::

(distance(P, (0,0))<p or distance(P, (0, yMax))<p or distance(P, (xMax, 0))<p or distance(P, (xMax, yMax))<p or distance(P, (xMax/2, 0))<p or distance(P, (xMax/2, yMax))<p).

This invention has been described with reference to the preferred embodiment. Obviously, modifications and alterations will occur to others upon a reading and understanding of the specification. It is intended that all such modifications and alterations be included insofar as they come within the scope of the appended claims or the equivalents thereof.

Having thus described the invention, it is now claimed:

1. A method of automatically constructing a controller for an electro-mechanical system comprising the steps of:

identifying the components which make-up the electro-mechanical system;

generating a dynamic behavior model of the system using a set of constraints for each of the components;

constructing a configuration space of the system by using the dynamic behavior model of the system to generate (i) a set of states each of which is a possible configuration of the system, and (ii) a set of transitions which exist between the states;

defining which states are reachable from an initial state based on certain ones of the transitions;

labeling each of the transitions as an external transition or an internal transition, where external transitions occur due to external events and internal transitions occur due to internal events which are under control of the controller;

identifying the defined states as (i) a desired state and (ii) undesirable states of the system; and automatically generating a program which drives the system from any one of the states towards the desired state, the changing of states based on the external events which cause one of the external transitions, and the events under control of the controller which cause one of the internal transitions.

2. The method according to claim 1 wherein the constraints are qualitative and quantitative constraints.

3. The method according to claim 1 wherein the labeled internal transition is a transition controlled by the constructed controller.

4. The method according to claim 1 further including extending the constructing of the configuration space to include potential failures in the system, whereby diagnostic information is provided to the automatically generated program.

5. The method according to claim 1 wherein the changing of states is further based on passage of time.

6. In a copy machine having a plurality of subsystems made up of individual components, where the subsystems are operated together to generate an output document, a method for constructing controllers to control operation of a subsystem which a particular controller is associated with, the method comprising the steps of:

selecting one of the subsystems for which a controller is to be constructed;

identifying the components which comprise the selected subsystem;

including the dynamic behavior of the selected subsystem using a set of constraints appropriate for the components of the selected subsystem;

constructing a configuration space of the subsystem which sets forth (i) states that are reachable from an initial state of the subsystem and (ii) transitions through which the reachable states can be reached from the initial state, whereby the configuration space provides all possible evolutions of the subsystem based on the modeled dynamic behavior of the subsystem;

labeling each of the transitions as an external transition or an internal transition, wherein external transitions occur due to an external event outside control of the controller and internal transitions occur due to an internal event within control of the controller;

identifying a desired state of the subsystem, wherein the desired state is the state the subsystem is in for proper operation of the subsystem; and generating a program which drives the subsystem from any state to the desired state, the generation of the program using information from the configuration space, the labeled transitions and the identified desired state.

7. The method according to claim 6 wherein the step of identifying the desired state further includes identifying undesirable states of the subsystem wherein the undesirable states are those which will result in damage to the subsystem.

8. The method according to claim 6 wherein the step of modeling the dynamic behavior of the selected subsystem includes modeling the dynamic behaviors of the components which make-up the subsystem, the components being physical objects.

9. The method according to claim 6 wherein the step of constructing the configuration space includes using a compilation algorithm.

10. The method according to claim 6 wherein the step of modeling includes using qualitative and quantitative constraints as the set of constraints.

* * * * *